(12) United States Patent
Muramatsu

(10) Patent No.: US 10,345,686 B2
(45) Date of Patent: Jul. 9, 2019

(54) PROJECTOR DEVICE

(71) Applicant: Panasonic Intellectual Property Management Co., Ltd., Osaka (JP)

(72) Inventor: Fumio Muramatsu, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 223 days.

(21) Appl. No.: 15/432,340

(22) Filed: Feb. 14, 2017

(65) Prior Publication Data

US 2017/0160626 A1    Jun. 8, 2017

Related U.S. Application Data

(63) Continuation of application No. PCT/JP2015/005689, filed on Nov. 16, 2015.

(30) Foreign Application Priority Data

Dec. 25, 2014 (JP) ................................. 2014-263641

(51) Int. Cl.
*G03B 21/14* (2006.01)
*G01S 17/08* (2006.01)
(Continued)

(52) U.S. Cl.
CPC .......... *G03B 21/145* (2013.01); *G01S 17/023* (2013.01); *G01S 17/08* (2013.01);
(Continued)

(58) Field of Classification Search
CPC ...... H04N 9/3194; H04N 9/3185; H04N 5/74; H04N 9/3179; H04N 9/3173;
(Continued)

(56) References Cited

U.S. PATENT DOCUMENTS

2006/0103627 A1    5/2006  Watanabe et al.
2009/0284714 A1    11/2009 Kogo et al.
(Continued)

FOREIGN PATENT DOCUMENTS

JP    9-50583       2/1997
JP    2003-6795     1/2003
(Continued)

OTHER PUBLICATIONS

International Search Report dated Feb. 2, 2016 in corresponding International Application No. PCT/JP2015/005689.

*Primary Examiner* — Zaihan Jiang
*Assistant Examiner* — Samuel D Fereja
(74) *Attorney, Agent, or Firm* — Wenderoth, Lind, & Ponack, L.L.P.

(57) ABSTRACT

A projector device includes a distance detector, an imaging unit, a projector unit, a driver, and a controller. The imaging unit detects a specific target object. The projector unit projects a projection image. The driver drives the projector unit such that a projection direction in which the projection image is to be projected is changed. The distance detector detects a state of the target object detected by the imaging unit. The controller controls at least one of the projector unit and the driver such that the projection image tracks the target object. The projection image has display data including a content for guiding the target object. The controller changes a content of information included in the display data in the projection image, which is to be projected while tracking the target object, according to the state of the target object detected by the distance detector.

6 Claims, 17 Drawing Sheets

(51) Int. Cl.
*G06Q 30/02* (2012.01)
*H04N 5/232* (2006.01)
*H04N 9/31* (2006.01)
*G01S 17/02* (2006.01)
*G01S 17/36* (2006.01)
*G01S 17/66* (2006.01)
*G01S 17/88* (2006.01)
*G01S 17/89* (2006.01)
*G06F 3/14* (2006.01)
*H04N 5/247* (2006.01)
*G06F 3/147* (2006.01)

(52) U.S. Cl.
CPC .............. *G01S 17/36* (2013.01); *G01S 17/66* (2013.01); *G01S 17/88* (2013.01); *G01S 17/89* (2013.01); *G06F 3/14* (2013.01); *G06F 3/147* (2013.01); *G06Q 30/0251* (2013.01); *H04N 5/23296* (2013.01); *H04N 5/247* (2013.01); *H04N 9/312* (2013.01); *H04N 9/3179* (2013.01); *H04N 9/3188* (2013.01); *H04N 9/3194* (2013.01); *G09G 2320/0261* (2013.01)

(58) Field of Classification Search
CPC .. H04N 9/3114; H04N 9/3129; H04N 9/3147; H04N 9/3158; H04N 9/3161; H04N 17/002; H04N 1/3876; H04N 21/4122; H04N 21/41407; H04N 21/42202; H04N 21/4223; H04N 21/47217; H04N 21/482; H04N 21/8133; H04N 5/225; H04N 5/2354; H04N 5/45; H04N 5/57; H04N 7/183; H04N 9/31; H04N 9/3141; H04N 9/315; H04N 9/317; H04N 9/3182; H04N 9/3188; H04N 9/3197; H04N 9/74; H04N 9/77; G03B 21/14; G03B 17/54; G03B 21/00; G03B 21/145; G03B 21/26; G03B 21/30; G03B 21/005; G03B 21/10; G03B 21/142; G03B 21/147; G03B 21/54; G03B 2206/00; G03B 29/00; G06F 3/0425; G06F 3/017; G06F 3/0304; G06F 1/1639; G06F 3/0346; G06F 2200/1637; G06F 3/011; G06F 3/0426; G06F 3/0488; G06F 17/50; G06F 1/1616; G06F 1/1626; G06F 1/1694; G06F 1/1696; G06F 2203/04101; G06F 2203/04104; G06F 2203/04809; G06F 3/005; G06F 3/013; G06F 3/014; G06F 3/0317; G06F 3/0354; G06F 3/0386; G06F 3/041; G06F 3/0416; G06F 3/0418; G06F 3/042; G06F 3/0421; G06F 3/048; G06F 3/0485; G06F 3/04886; G06F 3/1423; G06F 3/1454; G06F 3/147; H04M 1/0272; H04M 1/0214; H04M 2250/12; H04M 1/72522; H04M 2250/16; H04M 2250/52; B60Q 1/26; B60Q 1/00; B60Q 1/04; B60Q 1/525; B60Q 2400/50; B60Q 1/24; B60Q 9/008; B60Q 1/06; B60Q 1/08; B60Q 1/085; B60Q 1/14; B60Q 1/34
See application file for complete search history.

(56) References Cited

U.S. PATENT DOCUMENTS

| | | |
|---|---|---|
| 2010/0289664 A1 | 11/2010 | Mizushima et al. |
| 2011/0157486 A1 | 6/2011 | Murata et al. |
| 2011/0205497 A1* | 8/2011 | Wakabayashi ....... G02B 26/101 353/28 |
| 2011/0249241 A1 | 10/2011 | Wakabayashi |
| 2011/0293148 A1 | 12/2011 | Kobayashi |
| 2012/0133837 A1 | 5/2012 | Furukawa |
| 2013/0222157 A1 | 8/2013 | Fukushima |
| 2014/0176599 A1 | 6/2014 | Watanabe et al. |
| 2015/0317835 A1* | 11/2015 | Byers ................. H04L 65/1083 345/633 |

FOREIGN PATENT DOCUMENTS

| | | |
|---|---|---|
| JP | 2003-216765 | 7/2003 |
| JP | 2005-115270 | 4/2005 |
| JP | 2006-145645 | 6/2006 |
| JP | 2007-149053 | 6/2007 |
| JP | 2007-312026 | 11/2007 |
| JP | 2011-134172 | 7/2011 |
| JP | 2011-221214 | 11/2011 |
| JP | 2011-248548 | 12/2011 |
| JP | 2012-118121 | 6/2012 |
| JP | 2013-178718 | 9/2013 |
| JP | 2014-123277 | 7/2014 |
| WO | 2010/044204 | 4/2010 |

* cited by examiner

FIG. 8

| Shop | | Direction of movement | |
|---|---|---|---|
| | | Approaching | Moving away |
| Distance to projector device | Close | Welcome! (D11) | ← (D12) |
| | Far | ← (D13) | We are offering ○○ here. please come in. (D14) |

| Shop | | Direction of movement | |
|---|---|---|---|
| | | Approaching | Moving away |
| Movement speed | Low | ○○50% OFF! (D21) | x x with the largest selection! (D22) |
| | High | (D23) | (D24) |

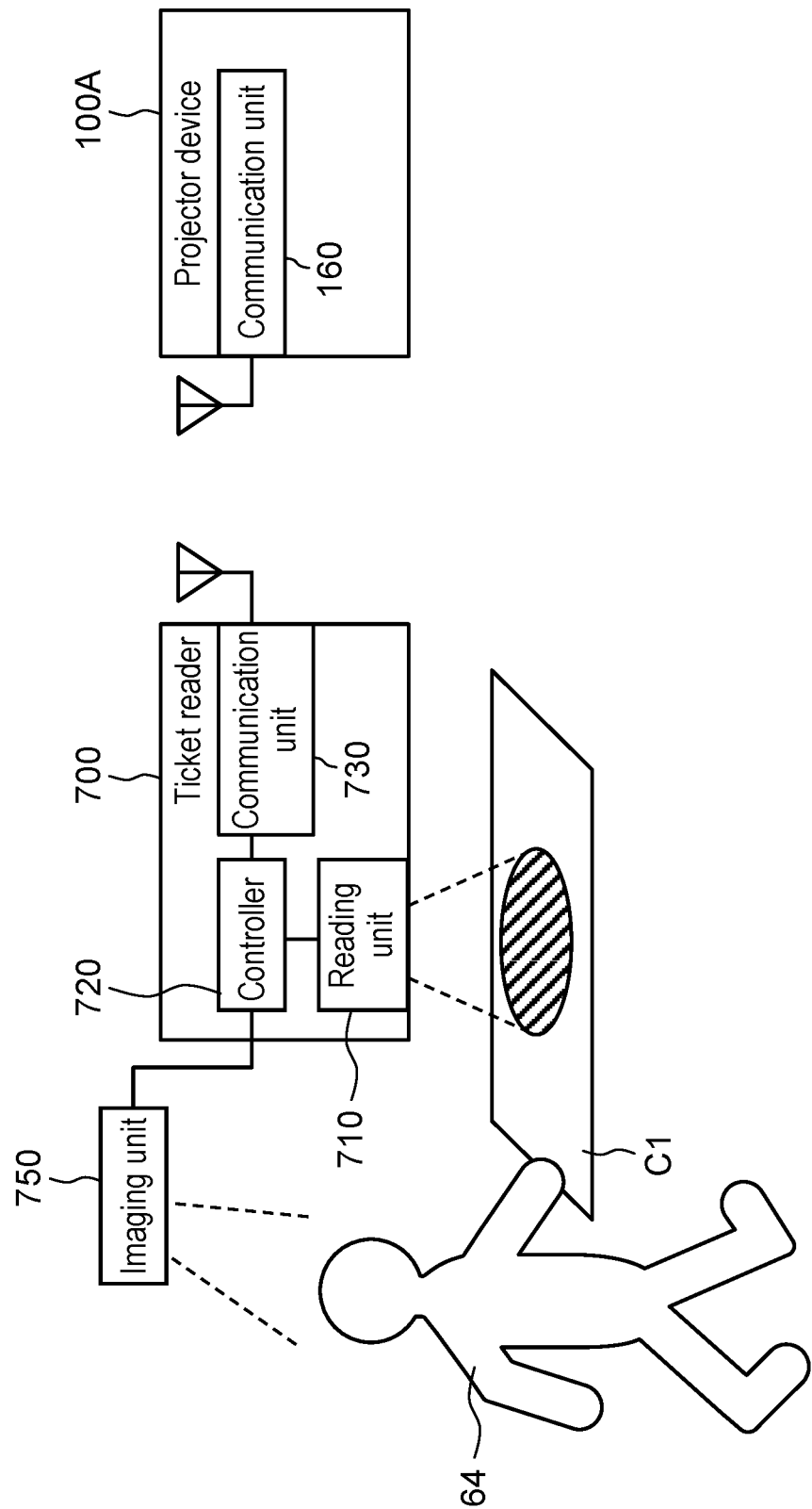

FIG. 14

| Seat in movie theater | | Row | |
|---|---|---|---|
| | | Right | Wrong |
| Distance to seat | Close | Spotlight (D31) | S ↑ (D33) |
| | Far | ← (D32) | S ↑ (D33) |

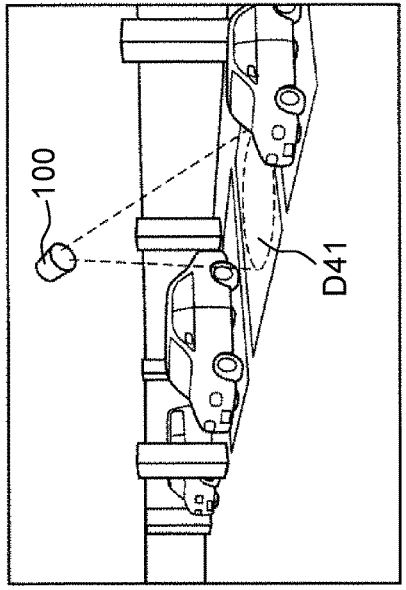
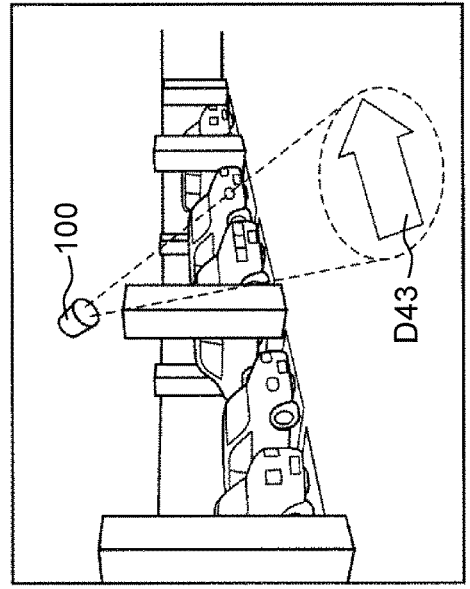
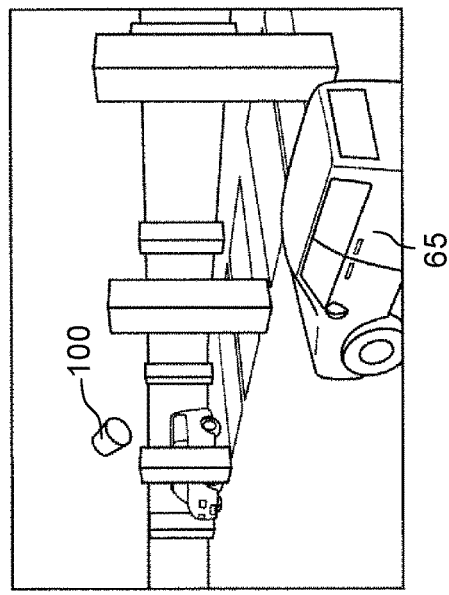
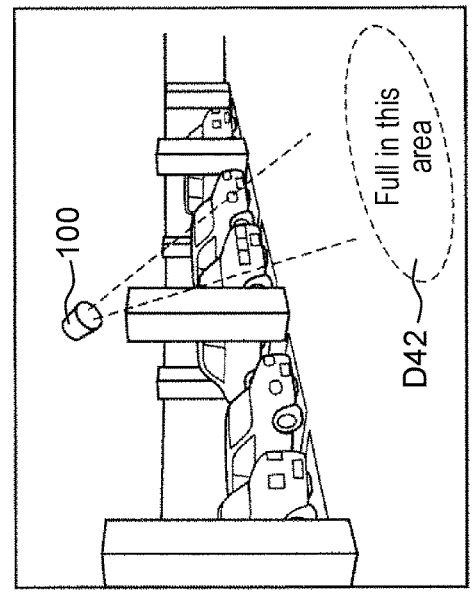

FIG. 17

| Leading vehicle in parking structure | | Number of empty spots | |
|---|---|---|---|
| | | Large | Small |
| Distance to empty spot | Close | No projection | Spotlight (D41) |
| | Far | Full in this area (D42) | ← (D43) |

D4

PROJECTOR DEVICE

BACKGROUND

1. Technical Field

The present disclosure relates to a projector device that projects an image.

2. Description of Related Art

Unexamined Japanese Patent Publication No. 2007-312026 discloses an imaging projector device that projects an image while tracking a moving object. The imaging projector device has, in a housing, a camera that captures an object and a projector that projects a projection image onto the object which has been captured, the camera and the projector being mounted such that their relative position and orientation are fixed. The imaging projector device is supported by a turning device that performs a pan drive control and tilt drive control in an imaging direction of the camera and a projection direction of the projector. The imaging projector device can easily continue capturing a moving object and the projection of an image onto the moving object by performing pan and tilt drive controls by the turning device such that the size and position of a target object in the image captured by the camera are substantially constant.

SUMMARY

The present disclosure provides a projector device that can effectively provide guidance including information for leading a target object, an advertisement, and the like according to a movement of a target object such as a person, when projecting a projection image to show this image to the target object.

A projector device according to the present disclosure includes first and second detectors, a projector unit, a driver, and a controller. The first detector detects a specific target object. The projector unit projects a projection image. The driver drives the projector unit such that a projection direction in which the projection image is to be projected is changed. The second detector detects a state of the target object detected by the first detector. The controller controls at least one of the projector unit and the driver such that the projection image tracks the target object. The projection image has guidance information including a content for guiding the target object. The controller changes a content of information included in the guidance information in the projection image, which is projected while tracking the target object, according to the state of the target object detected by the second detector.

The projector device according to the present disclosure changes guidance information in a projection image according to a state of a target object, thereby being capable of effectively providing guidance including information for leading the target object, an advertisement, and the like according to a movement of the target object such as a person, when projecting the projection image to show this image to the target object.

BRIEF DESCRIPTION OF DRAWINGS

FIG. 8 is a diagram illustrating a display data table referred to in the guidance projection process in the first exemplary embodiment;

FIG. 10 is a diagram illustrating a display data table referred to in the guidance projection process in the second exemplary embodiment;

FIG. 12 is a block diagram illustrating the configuration of the seat guidance system;

FIG. 14 is a diagram illustrating a display data table referred to in the guidance projection process in the third exemplary embodiment;

FIG. 15A is an explanatory view for describing a guidance projection process of a projector device according to a fourth exemplary embodiment;

FIG. 15B is an explanatory view for describing the guidance projection process of the projector device according to the fourth exemplary embodiment;

FIG. 15C is an explanatory view for describing the guidance projection process of the projector device according to the fourth exemplary embodiment;

FIG. 15D is an explanatory view for describing the guidance projection process of the projector device according to the fourth exemplary embodiment;

FIG. 17 is a diagram illustrating a display data table referred to in the guidance projection process in the fourth exemplary embodiment.

DETAILED DESCRIPTION

Exemplary embodiments will be described below in detail with reference to the drawings as necessary. However, more than necessary detailed descriptions will sometimes be omitted. For example, detailed descriptions for matters which have already been well known in the art and redundant descriptions for substantially the same configurations will sometimes be omitted. This is to prevent the description below from becoming unnecessarily redundant to facilitate understanding of a person skilled in the art.

Note that the accompanying drawings and the following description are provided by the applicant in order for a person of ordinary skill in the art to sufficiently understand the present disclosure, and they are not intended to limit the subject matter set forth in the claims.

First Exemplary Embodiment

Projector device 100 will be described as a specific embodiment of a projector device according to the present disclosure.

Figure 1:
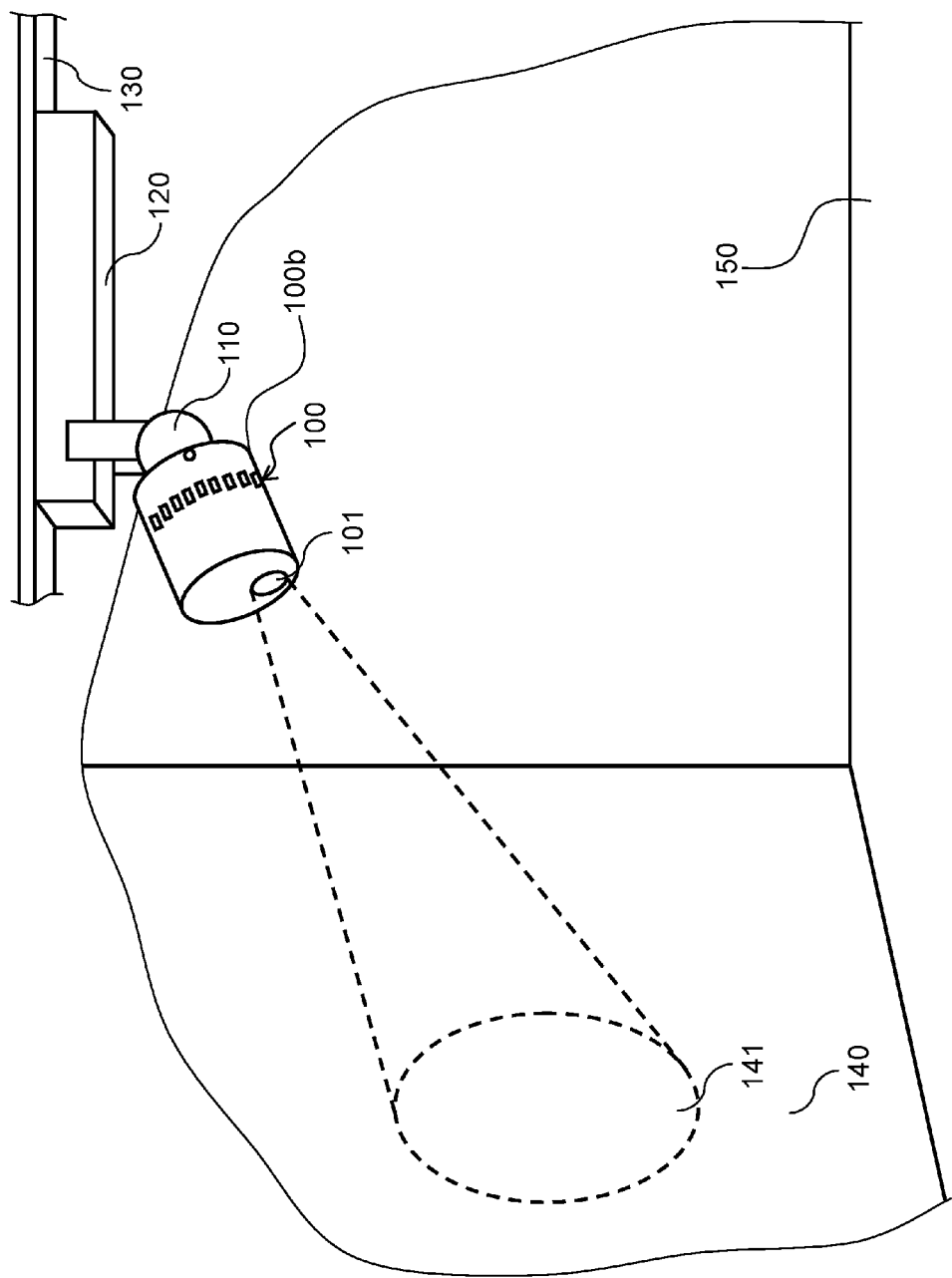
FIG. 1 is a conceptual view illustrating that a projector device according to a first exemplary embodiment projects a projection image onto a wall surface.
Figure 2:
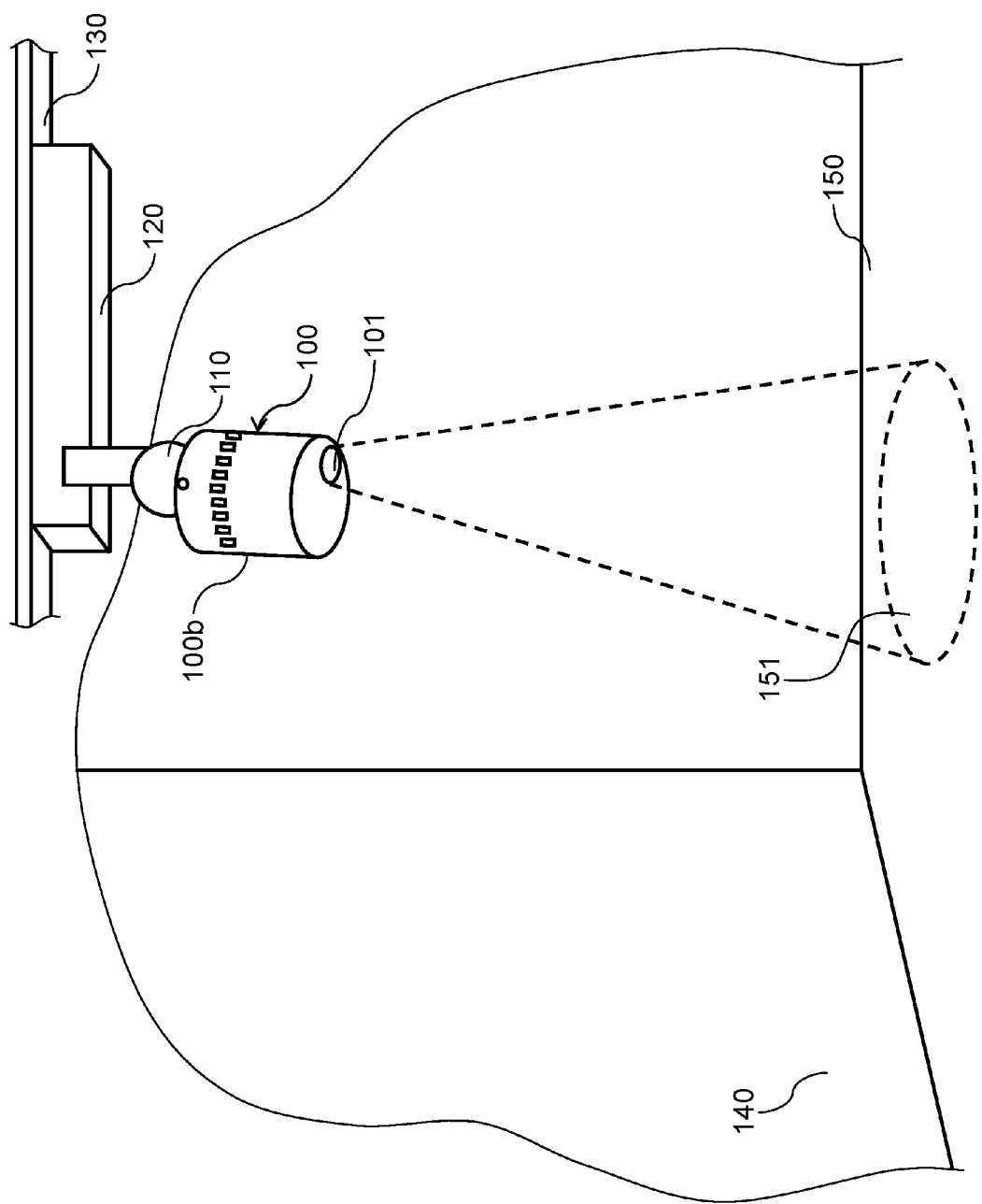
FIG. 2 is a conceptual view illustrating that the projector device projects a projection image onto a floor surface.

The outline of an image projection operation by projector device 100 will be described with reference to FIGS. 1 and 2. FIG. 1 is a conceptual view illustrating that projector device 100 projects a projection image onto wall surface 140. FIG. 2 is a conceptual view illustrating that projector device 100 projects a projection image onto floor surface 150.

As illustrated in FIGS. 1 and 2, projector device 100 is fixed to housing 120 together with driver 110. Wiring lines electrically connected to components composing projector device 100 and driver 110 are connected to a power source through housing 120 and wiring duct 130. Thus, power is supplied to projector device 100 and driver 110. Projector device 100 has opening 101. Projector device 100 projects a projection image through opening 101.

Driver 110 can drive projector device 100 so as to change a projection direction of projector device 100. Driver 110 can drive body 100b of projector device 100 in a pan direction (horizontal direction) and a tilt direction (vertical direction). As illustrated in FIG. 1, driver 110 can drive projector device 100 so that the projection direction of projector device 100 is toward wall surface 140. Thus, projector device 100 can project projection image 141 onto wall surface 140. Similarly, driver 110 can drive projector device 100 so that the projection direction of projector device 100 is toward floor surface 150 as illustrated in FIG. 2. Thus, projector device 100 can project projection image 151 onto floor surface 150. Driver 110 may be driven on the basis of a manual operation of a user, or may automatically be driven in response to a detection result of a predetermined sensor. Further, projection image 141 projected on wall surface 140 and projection image 151 projected on floor surface 150 may be different from each other or may be the same.

Figure 3:
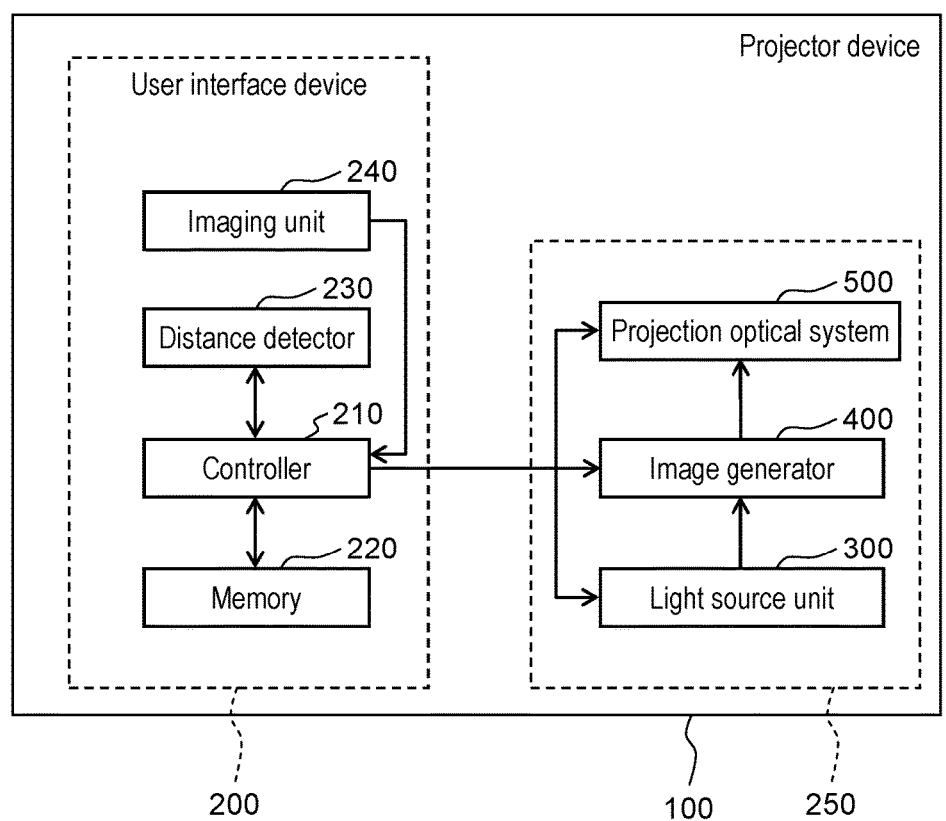
FIG. 3 is a block diagram illustrating an electric configuration of the projector device.

FIG. 3 is a block diagram illustrating an electric configuration of projector device 100. As illustrated in FIG. 3, projector device 100 includes user interface device 200. Thus, projector device 100 can execute various controls for a projection image according to an operation made by a person or a standing position of a person.

Hereinafter, the configuration and operation of projector device 100 will be described in detail.

<1. Configuration of Projector Device>

Projector device 100 includes user interface device 200 and projector unit 250. Projector unit 250 includes light source unit 300, image generator 400, and projection optical system 500. The configuration of each component composing projector device 100 will be described below.

User interface device 200 includes controller 210, memory 220, distance detector 230, and imaging unit 240. Imaging unit 240 is one example of a first detector that detects a specific target object. Distance detector 230 is one example of a second detector that detects a state of a detected target object.

Controller 210 is a semiconductor device that entirely controls projector device 100. Specifically, controller 210 controls the operations of the components (imaging unit 240, distance detector 230, and memory 220) composing user interface device 200 and the components (light source unit 300, image generator 400, and projection optical system 500) composing projector unit 250. Controller 210 can also perform a digital zoom control for zooming out and zooming in a projection image with an image signal process. Controller 210 may be composed only of hardware, or may be implemented by combining hardware and software.

Memory 220 is a memory device that stores various pieces of information. Memory 220 is composed of a flash memory or a ferroelectric memory. Memory 220 stores a control program and the like for controlling projector device 100 (including user interface device 200). Memory 220 also stores various information supplied from controller 210. Memory 220 also stores settings of a projection size with which a projection image is expected to be displayed, and data such as a table of focusing value according to information about the distance to a projection surface (wall surface 140 or floor surface 150).

Imaging unit 240 is composed of a CCD (Charge-Coupled-Device) camera, for example, and captures an RGB image based on visible light. An RGB image captured by imaging unit 240 is output to controller 210.

Figure 4A:
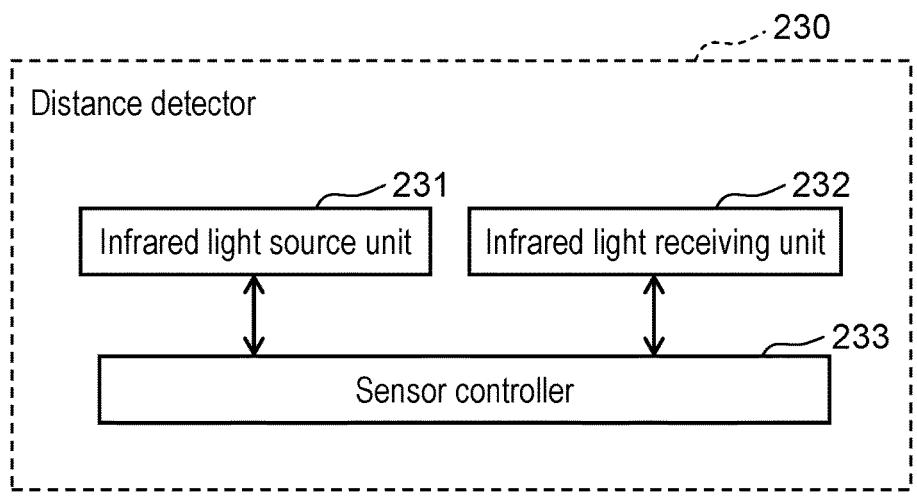
FIG. 4A is a block diagram illustrating an electric configuration of a distance detector.

Distance detector 230 includes a TOF (Time-of-Flight) sensor, for example, and linearly detects the distance between itself and a surface facing distance detector 230. When facing wall surface 140, distance detector 230 detects the distance between itself and wall surface 140. Similarly, when facing floor surface 150, distance detector 230 detects the distance between itself and floor surface 150. FIG. 4A is a block diagram illustrating an electric configuration of distance detector 230. As illustrated in FIG. 4A, distance detector 230 includes infrared light source unit 231 that emits infrared detection light, infrared light receiving unit 232 that receives infrared detection light reflected on an opposed surface, and sensor controller 233. Infrared light source unit 231 emits infrared detection light through opening 101 such that the infrared detection light is diffused all around. Infrared light source unit 231 uses infrared light with a wavelength of 850 nm to 950 nm as infrared detection light, for example. Sensor controller 233 stores the phase of the infrared detection light emitted from infrared light source unit 231 in an internal memory of sensor controller 233. In the case where the surface facing distance detector 230 is not equally distant from distance detector 230 and has a tilt or shape, a plurality of pixels arrayed on an imaging surface of infrared light receiving unit 232 receives infrared detection light as reflection light at different timings. Since the plurality of pixels receives infrared detection light at different timings, the phases of the infrared detection light received by the respective pixels on infrared light receiving unit 232 are different from one another. Sensor controller 233 stores the phase of the infrared detection light received by each pixel of infrared light receiving unit 232 into the internal memory.

Sensor controller 233 reads the phase of the infrared detection light emitted from infrared light source unit 231 and the phase of the infrared detection light received by each pixel in infrared light receiving unit 232 from the internal memory. Sensor controller 233 measures the distance between distance detector 230 and the surface facing the distance detector 230 on the basis of the phase difference between the infrared detection light emitted from distance detector 230 and the infrared detection light received by infrared light receiving unit 232, thereby generating distance information (distance image). Note that the surface facing distance detector 230 is wall surface 140, floor surface 150, a surface of a later-described target object (for example, persons 61 to 63), and the like.

Figure 4B:
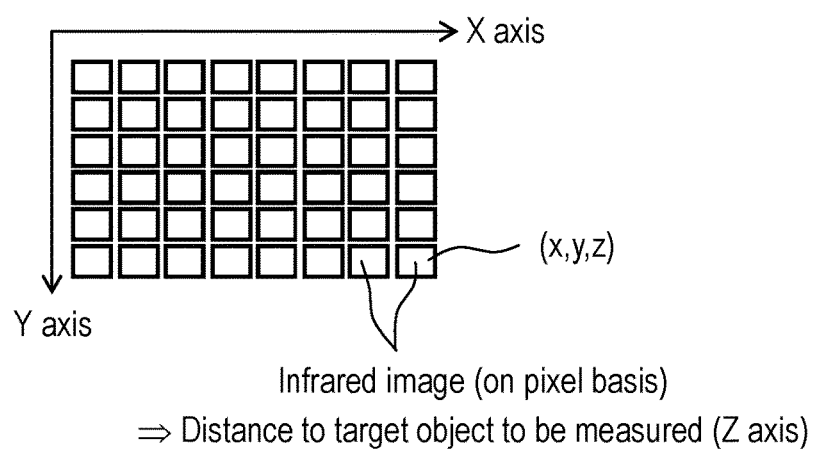
FIG. 4B is a diagram for describing an infrared image captured by the distance detector.

FIG. 4B is a diagram for describing distance information acquired by distance detector 230 (sensor controller 233). Distance detector 230 detects a distance for each of the pixels composing an infrared image based on the received infrared detection light. Thus, controller 210 can acquire the detection result of the distance of the infrared image based on infrared detection light received by distance detector 230 in the entire angle of view on a pixel basis. In the description below, the horizontal direction of the infrared image is defined as an X axis, and the vertical direction is defined as a Y axis, as illustrated in FIG. 4B. The direction of the detected distance is defined as a Z axis. Controller 210 can acquire coordinates (x, y, z) of three axes of XYZ for each pixel composing the infrared image on the basis of the detection result of distance detector 230. Specifically, controller 210 can acquire distance information (distance image) on the basis of the detection result of distance detector 230. Controller 210 acquires distance information every predetermined time interval (e.g., 1/60 seconds).

A TOF sensor is used as distance detector 230 in the above. However, the present disclosure is not limited thereto. Specifically, distance detector 230 may use the one that projects a known pattern such as a random dot pattern and calculates distance using the deviation from the pattern, or may be the one that uses parallax with a stereo camera.

Figure 5:
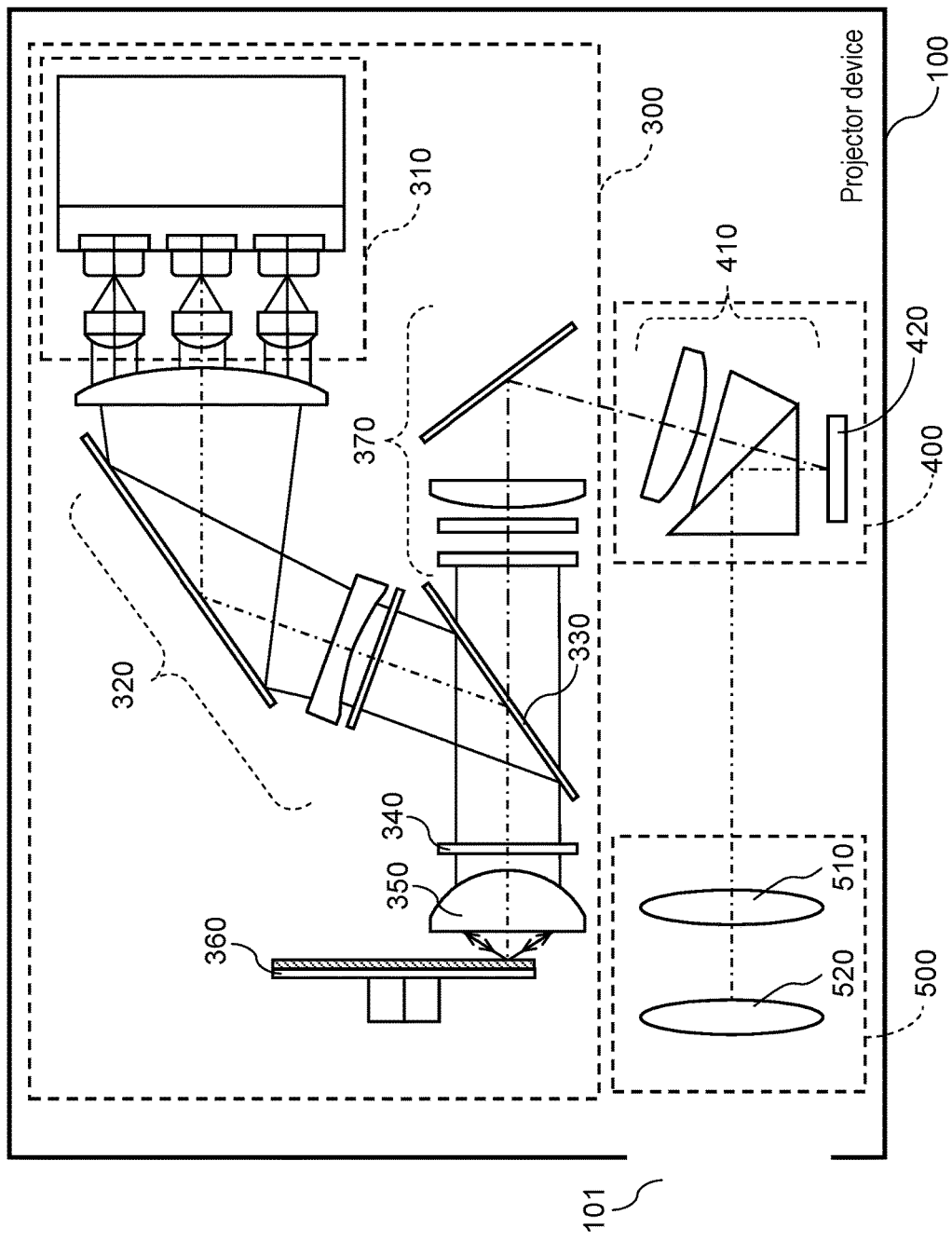
FIG. 5 is a block diagram illustrating an optical configuration of the projector device.

Next, the configuration of light source unit 300, image generator 400, and projection optical system 500, which are other than user interface device 200 out of the components mounted to projector device 100, will be described with reference to FIG. 5. FIG. 5 is a block diagram illustrating an optical configuration of projector device 100. As illustrated in FIG. 5, light source unit 300 supplies light, which is necessary for generating a projection image, to image generator 400. Image generator 400 supplies the generated projection image to projection optical system 500. Projection optical system 500 performs optical conversion, such as focusing and zooming, to the projection image supplied from image generator 400. Projection optical system 500 faces opening 101, and projects a projection image through opening 101.

Firstly, the configuration of light source unit 300 will be described. As illustrated in FIG. 5, light source unit 300 includes semiconductor laser 310, dichroic mirror 330, λ/4 plate 340, phosphor wheel 360, and the like.

Semiconductor laser 310 is a solid light source that emits S-polarized blue light with a wavelength of 440 nm to 455 nm, for example. S polarized blue light emitted from semiconductor laser 310 is incident on dichroic mirror 330 through light guide optical system 320.

For example, dichroic mirror 330 is an optical element having a high reflectance of 98% or more for S polarized blue light with a wavelength of 440 nm to 455 nm, while having a high transmittance of 95% or more for P polarized blue light with a wavelength of 440 nm to 455 nm and green light to red light with a wavelength of 490 nm to 700 nm regardless of polarization state. Dichroic mirror 330 reflects S polarized blue light emitted from semiconductor laser 310 toward λ/4 plate 340.

λ/4 plate 340 is a polarization element that converts linear polarized light into circular polarized light or converts circular polarized light into linear polarized light. λ/4 plate 340 is disposed between dichroic mirror 330 and phosphor wheel 360. S polarized blue light incident on λ/4 plate 340 is converted into circular polarized blue light, and then, emitted to phosphor wheel 360 through lens 350.

Phosphor wheel 360 is a flat plate configured to be rotatable at high speed. Phosphor wheel 360 has, on its surface, a plurality of B regions that is a region of a diffusion reflection plane, a plurality of G regions on which a phosphor emitting green light is applied, and a plurality of R regions on which a phosphor emitting red light is applied. Circular polarized blue light emitted to the B regions on phosphor wheel 360 is diffusely reflected, and again enters λ/4 plate 340 as circular polarized blue light. Circular polarized blue light incident on λ/4 plate 340 is converted into P polarized blue light, and then, again enters dichroic mirror 330. The blue light incident on dichroic mirror 330 at that time is P polarized light. Therefore, this blue light passes through dichroic mirror 330, and enters image generator 400 through light guide optical system 370.

Blue light emitted on the G regions or the R regions on phosphor wheel 360 excites the phosphor applied on the G regions or the R regions to allow the phosphor to emit green light or red light. Green light or red light emitted from the G regions or the R regions enters dichroic mirror 330. The green light or red light incident on dichroic mirror 330 at that time passes through dichroic mirror 330, and enters image generator 400 through light guide optical system 370.

Due to the high-speed rotation of phosphor wheel 360, blue light, green light, and red light are time divided and emitted from light source unit 300 to image generator 400.

Image generator 400 generates a projection image according to an image signal supplied from controller 210. Image generator 400 includes DMD (Digital-Mirror-Device) 420, and the like. DMD 420 is a display element on which a lot of micromirrors are arrayed on a flat plane. DMD 420 deflects each of the arrayed micromirrors according to the image signal supplied from controller 210 to spatially modulate the incident light. Light source unit 300 emits blue light, green light, and red light in a time-division way. DMD 420 repeatedly and sequentially receives blue light, green light, and red light which are time divided and emitted through light guide optical system 410. DMD 420 deflects each of the micromirrors in synchronization with the timing at which light of each color is emitted. Thus, image generator 400 generates a projection image according to the image signal. DMD 420 deflects the micromirrors to cause a part of light to be directed to projection optical system 500 and to cause the remaining light to be directed outside an effective range of projection optical system 500, according to the image signal. Thus, image generator 400 can supply the generated projection image to projection optical system 500.

Projection optical system 500 includes optical members such as zoom lens 510 and focusing lens 520. Projection optical system 500 enlarges light directed from image generator 400 and projects the resultant light on a projection surface (wall surface 140 or floor surface 150). Controller 210 adjusts the position of zoom lens 510, thereby being capable of controlling a projection region relative to a projection surface such that the projection image has a size of a desired zoom value. In order to increase the zoom value, controller 210 moves zoom lens 510 in the direction in which the angle of view is decreased to narrow the projection region. On the other hand, in order to decrease the zoom value, controller 210 moves zoom lens 510 in the direction in which the angle of view is increased to widen the projection region. In addition, controller 210 adjusts the position of focusing lens 520 on the basis of predetermined zoom tracking data so as to track the movement of zoom lens 510. Thus, controller 210 can perform focusing of a projection image.

In the above description, the configuration of DLP (Digital-Light-Processing) system using DMD 420 is used as one example of projector device 100. However, the present disclosure is not limited thereto. That is, a configuration using a liquid crystal system may be applied to projector device 100.

The configuration using a single-chip system in which a light source is time divided using phosphor wheel 360 has been described above as one example of projector device 100. However, the present disclosure is not limited thereto. That is, for projector device 100, the configuration using three-light-source system provided with light sources of blue light, green light, and red light may be used, or a three-chip configuration provided with DMD 420 for each color of RGB may be used.

The configuration in which a light source emitting blue light for generating a projection image and a light source emitting infrared light for distance measurement are different units has been described above. However, the present disclosure is not limited thereto. That is, a unit formed by combining a light source emitting blue light for generating a projection image and a light source emitting infrared light for distance measurement may be used. If a three-light-source system is employed, a unit formed by combining light sources of respective colors and an infrared light source may be used.

<2. Operation>

2-1. Outline of Operation

Figure 6:
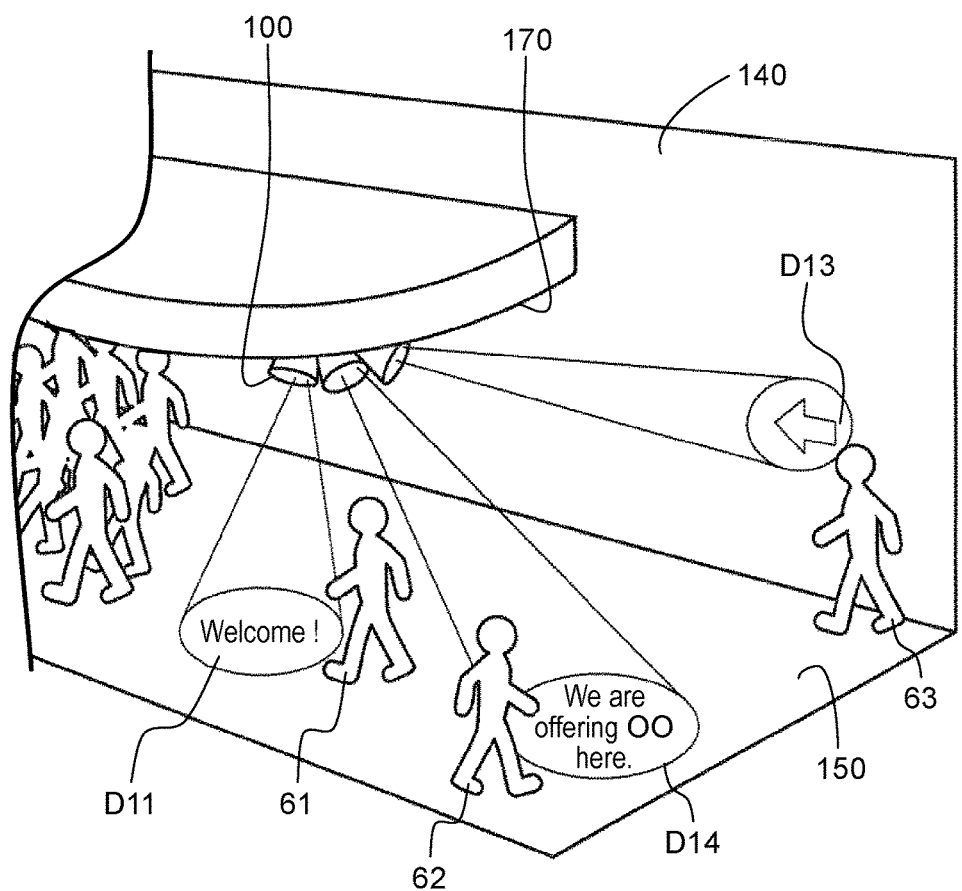
FIG. 6 is an explanatory view for describing an operation of the projector device according to the first exemplary embodiment.

The outline of a projection operation of projector device 100 according to the present exemplary embodiment will be described with reference to FIG. 6. FIG. 6 is an explanatory view for describing the outline of the operation of projector device 100 according to the present exemplary embodiment.

Projector device 100 according to the present exemplary embodiment detects a specific person using distance information (distance image) from distance detector 230 or an image captured by imaging unit 240, and projects a predetermined projection image near the person by tracking the movement of the detected person. As illustrated in FIG. 6, projector device 100 is installed on a passage leading to an entrance of a shop, for example, and projects, to persons 61 to 63 around here, a projection image for providing guidance such as direction to the shop, an advertisement, or presentation for enhancing the mood for the entry into the shop. For example, a projection image includes an arrow for showing the direction for a person, a welcome message for a person, an advertising text, and an image for creating an impressive presentation for a movement of a person, such as a red carpet. The projection image may be a still image or a moving image.

In this case, each of persons walking on the passage as illustrated in FIG. 6 freely moves, and his/her interest is shifted while moving. Therefore, matters that are easy to be received in providing guidance of the shop are changed for each person. In view of this, in the present exemplary embodiment, a position of a person which is a target for projection, a direction of movement of the person, a distance between the person and a shop, and the like are detected as a state of the person. Then, projector device 100 selects a projection image including a guidance content according to the detected state, and projects this projection image on a readily visible position to the person while tracking the person.

For example, as illustrated in FIG. 6, person 61 who is near projector device 100 and moving toward projector device 100 is moving toward the shop. Therefore, a welcome message such as "Welcome" is projected to person 61. On the other hand, person 62 who is far from projector device 100 and is moving away from projector device 100 is considered to be not interested in the shop. Therefore, a message for calling attention is projected to person 62. Thus, according to the movement of a person, a matter that is easy to be received by the person is projected, whereby guidance including information for leading the person to the shop, an advertisement of the shop, and the like can effectively be provided by the projection image.

2-2. Detail of Operation

Hereinafter, the detailed operation of projector device 100 according to the present exemplary embodiment will be described.

2-2-1. Tracking Operation of Projection Image

Firstly, the tracking operation of a projection image of projector device 100 according to the present exemplary embodiment will be described with reference to FIGS. 1 to 4 and 6. In the present exemplary embodiment, three projector devices 100 are installed on ceiling 170 of the passage. Firstly, in each projector device 100, imaging unit 240 captures an image of floor surface 150 or wall surface 140 of the passage illustrated in FIG. 6, for example, and distance detector 230 detects distance information of a region captured by imaging unit 240 (see FIGS. 3, 4A and 4B). Controller 210 detects a specific person on the basis of the captured image. The specific person is one of persons 61 to 63 illustrated in FIG. 6, for example, and is a target which is to be tracked and for which the projection image is to be projected. In the present exemplary embodiment, one projector device 100 can track only one target person, at a time, for projecting a projection image therefor.

In each projector device 100, controller 210 detects the position and the direction of movement of the detected person on the basis of the image captured by imaging unit 240 and the distance information from distance detector 230. Drive unit 110 drives body 100b of projector device 100 in the pan direction or tilt direction according to a drive control of controller 210 in such a manner that a projection image is projected on a projection position which is located forward by a predetermined distance on an extension of the direction of movement of the person (see FIGS. 1 and 2). Controller 210 detects the position and the direction of movement of the person every predetermined period (for example, 1/60 seconds) to set a projection position, and performs drive control to driver 110 such that projector device 100 projects the projection image while tracking the person.

2-2-2. Guidance Projection Process

Figure 7:
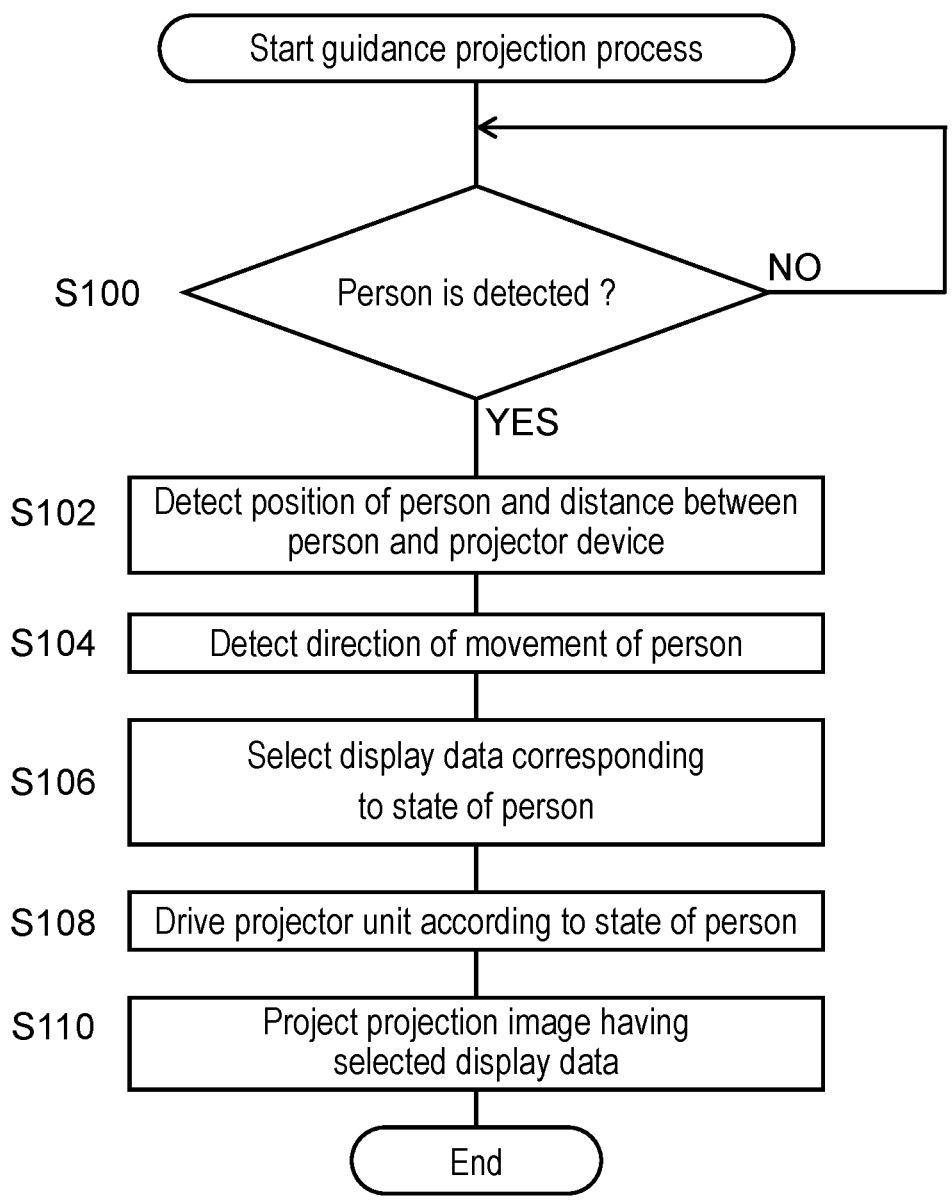
FIG. 7 is a flowchart illustrating a flow of a guidance projection process in the first exemplary embodiment.

Next, the flow of a guidance projection process of projector device 100 according to the present exemplary embodiment will be described with reference to FIGS. 6 to 8. The guidance projection process is to project a projection image while changing a guidance content in the projection image according to a state of a person. FIG. 7 is a flowchart illustrating the flow of the guidance projection process in the present exemplary embodiment. This flow is executed by controller 210 in each projector device 100 (see FIG. 3).

Firstly, controller 210 determines whether or not a specific person is detected (S100). A person is detected by face recognition in an image captured by imaging unit 240, for example. When there is a plurality of persons in the captured image, an individual may be identified by detailed face recognition, or a person may randomly be selected.

Note that a person may be detected using distance detector 230 in the process in step S100. For example, basic distance information indicating a distance to a background such as floor surface 150 is firstly stored in advance in memory 220. When acquiring distance information for the case in which there is a person on the background, controller 210 detects the person on the basis of an amount of change of the acquired distance information from the basic distance information.

When determining that a person is detected (YES in S100), controller 210 detects the distance between the detected person and itself (projector device 100 performing this process) and the position of the person on the background such as floor surface 150, using distance detector 230 (S102).

Then, controller 210 detects the direction of movement of the person (S104). In the process in step S104, imaging unit 240 may be used, or vector analysis may be performed in the captured image to detect the direction of movement of the person. Alternatively, the eye line of the person may be recognized by image analysis of the captured image.

Next, controller 210 selects display data indicating the content to be displayed in the projection image on the basis of the state of the person including the distance and the direction of movement which have been detected (S106). In the present exemplary embodiment, a state of a target object indicates a state of a person, and the state of a person includes the distance between the person and projector device 100 and the direction of movement of the person. Specifically, controller 210 selects display data to be projected as a projection image by referring to display data table D1 illustrated in FIG. 8. The detail of the display data will be described later.

Next, controller 210 sets a projection position of the projection image by controlling driver 110 according to the distance and the direction of movement which have been detected (S108). Driver 110 drives projector unit 250 in the pan direction or tilt direction along with body 100b of projector device 100, thereby turning the projection direction toward the projection position which has been set. The projection position of the projection image is set on a position, which is on an extension of the direction of movement of the person and which is located forward by a predetermined distance from the position of the person, on floor surface 150, for example, in order that the person easily sees the projection image. In addition, the projection position may be set on wall surface 140. For example, the projection position may be set on a position which is forward from the position of the person by a predetermined distance and which is on the same level as the eye height of the person.

Next, controller 210 projects the projection image that displays the display data which has been selected in step S108 (S110), and ends this process. In the process in step S104, controller 210 performs control such that image generator 400 generates the projection image, and performs control such that projection optical system 500 projects the projection image while focusing on the projection position.

Controller 210 repeatedly executes the guidance projection process described above in a predetermined period (for example, 0.1 seconds).

2-2-3. With Respect to Display Data

Subsequently, the display data selected in step S106 in FIG. 7 will be described with reference to FIG. 8.

FIG. 8 shows display data table D1 which is referred to in the guidance projection process. Display data table D1 is a table including display data recorded in association with a state of a person, and is stored in memory 220 in advance. Display data table D1 includes, as display data, welcome text data D11, attention-attracting text data D14, and arrow image data D12 and D13. Welcome text data D11 includes a text welcoming entry into the shop and receiving the person, such as "Welcome". Attention-attracting text data D14 includes a text of a message for attracting attention to the shop, such as "We are offering xx here. Please come in." Arrow image data D12 and D13 indicate graphics of arrows. Each display data is one example of guidance information for leading the person (target object) in the projection image.

In display data table D1, display data to be displayed in the projection image and a selection condition based on the distance and direction of movement of the person are managed in association with each other. In step S106, controller 210 reads display data table D1 stored in memory 220, and selects display data associated with the state of the person which has been detected in steps S102 and S104 from display data table D1.

For example, when the distance between the person and projector device 100 detected in step S102 is shorter than a predetermined reference distance (for example, the distance between projector device 100 and a predetermined position on floor surface 150) and the direction of movement detected in step S104 is in the direction toward projector device 100, controller 210 selects welcome text data D11. In addition, when the distance between projector device 100 and the person is shorter than the reference distance and the direction of movement is in the direction away from projector device 100, or when the distance between projector device 100 and the person is longer than the reference distance and the direction of movement is in the direction toward projector device 100, controller 210 selects arrow image data D12, D13. In addition, when the distance between projector device 100 and the person is longer than the reference distance and the direction of movement is in the direction away from projector device 100, controller 210 selects attention-attracting text data D14.

When projecting the display data selected in step S108, controller 210 generates the projection image while aligning the orientation thereof so that the person tracked by controller 210 can easily see the display data. For example, when selecting welcome text data D11 or attention-attracting text data D14, controller 210 generates a projection image while aligning the orientation of the text so that persons 61 and 62 can easily read the text. In addition, when selecting arrow image data D13, controller 210 generates a projection image while aligning the direction of the arrow graphic so that the arrow graphic points toward one side of the passage.

Note that each of display data D11 to D14 in display data table D1 is one example, and display data including other guidance content may be employed. For example, in place of attention-attracting text data D14, a message expressing appreciation for the visit to the shop, such as "Thank you for visiting our shop" may be displayed.

As described above, in the present exemplary embodiment, a projection image having a content according to a state of a visitor (position, distance, and direction of movement of a visitor) with respect to a shop is projected. In conjunction with the movement of the projection position by driver 110 according to the state of the visitor such as the position of the visitor, guidance information such as a text or an image in the projection image is appropriately switched, whereby guidance including information for leading the visitor, an advertisement, and the like can effectively be provided.

<3. Effects, Etc.>

As described above, in the present exemplary embodiment, projector device 100 includes distance detector 230, imaging unit 240, projector unit 250, driver 110, and controller 210. Imaging unit 240 detects a specific target object. Projector unit 250 projects a projection image. Driver 110 drives projector unit 250 such that a projection direction in which the projection image is to be projected is changed. Controller 210 controls driver 110 such that the projection image tracks the target object. The projection image has display data D11 to D14 including a content for guiding the target object. Distance detector 230 detects a state of the target object detected by imaging unit 240. Controller 210 changes a content of information included in display data D11 to D14 in the projection image, which is projected while tracking the target object, according to the state of the target object detected by distance detector 230.

The state of the target object in the present exemplary embodiment is information concerning a passing movement of persons 61 to 63 that are the target objects, and more specifically, it is the distance between projector device 100 and each of persons 61 to 63 and the direction of movement of each of persons 61 to 63. According to projector device 100 in the present exemplary embodiment, display data D11 to D14 in a projection image is changed according to the state of persons 61 to 63 (distance, direction of movement), whereby projector device 100 can effectively provide guidance including information for leading persons 61 to 63, an advertisement, and the like according to the movement of persons 61 to 63, when projecting the projection image to show this image to persons 61 to 63. In addition, projector device 100 can provide a projection image having a high visibility according to the movement of persons 61 to 63.

Second Exemplary Embodiment

A second exemplary embodiment will be described below with reference to the drawings. Projector device 100 in the first exemplary embodiment changes display data on the basis of the distance between a person and projector device 100 and the direction of movement of the person. On the other hand, in the present exemplary embodiment, display data is changed on the basis of a movement vector of a person (a movement speed of the person and the direction of movement of the person). Specifically, a state of a target object in the present exemplary embodiment is information concerning a passing movement of a person that is the target object, and more specifically, it is a movement vector of a person (a movement speed of the person and the direction of movement of the person).

A projector device according to the present exemplary embodiment will be described below in such a way that the configurations and operations similar to those of projector device 100 in the first exemplary embodiment are omitted as appropriate.

Figure 9A:
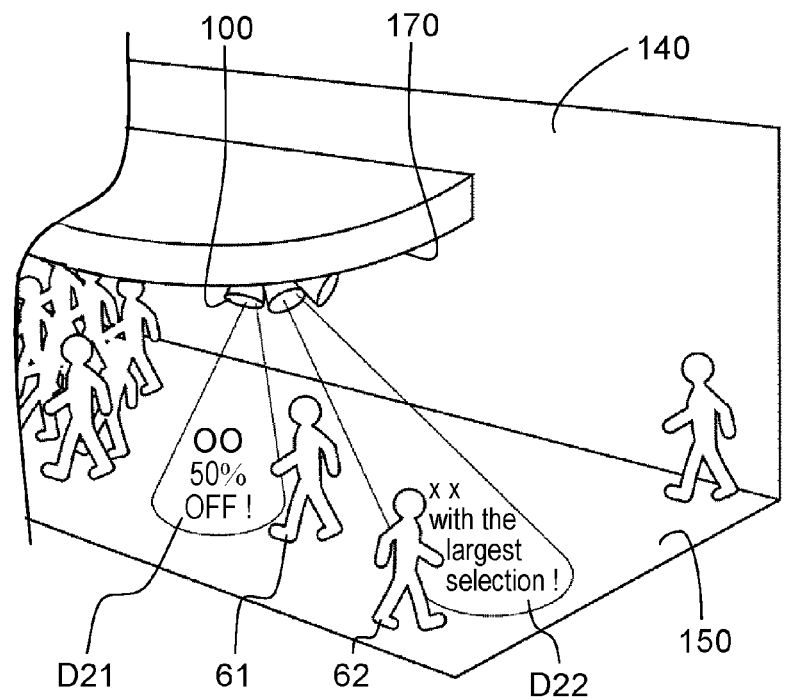
FIG. 9A is an explanatory view for describing a guidance projection process of a projector device according to a second exemplary embodiment.
Figure 9B:
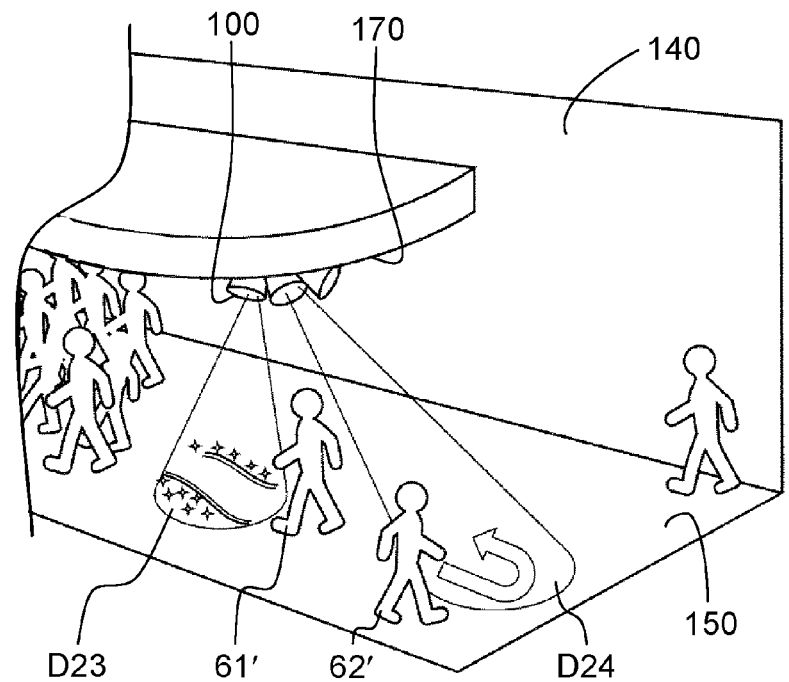
FIG. 9B is an explanatory view for describing the guidance projection process of the projector device according to the second exemplary embodiment.

The projector device according to the present exemplary embodiment is configured similarly to projector device 100 in the first exemplary embodiment (see FIGS. 1 to 5). In the present exemplary embodiment, a state of a person includes a direction of movement and a movement speed, and the projector device in the present exemplary embodiment performs a guidance projection process similar to that in the first exemplary embodiment while detecting a direction of movement and movement speed of a person that is a target object (see FIG. 7). The guidance projection process according to the present exemplary embodiment will be described below with reference to FIGS. 7, 9A, 9B, and 10. FIGS. 9A and 9B are explanatory views for describing the guidance projection process according to the present exemplary embodiment. FIG. 10 shows display data table D2 referred to in the guidance projection process in the present exemplary embodiment.

In the guidance projection process illustrated in FIG. 7, controller 210 performs a process for detecting a movement speed of a person between step S104 and step S106, for example, in the present exemplary embodiment. A movement speed of a person may be detected on the basis of a change in distance information for every predetermined period or may be detected by vector analysis in an image captured by imaging unit 240, for example. Controller 210 determines whether a person that is a target object to be tracked is running or walking on the basis of whether or not the detected movement speed is larger than a predetermined reference speed (for example, 1 km per hour).

In addition, in step S106, controller 210 selects display data from display data table D2 illustrated in FIG. 10, and projects a projection image of the display data selected from display data table D2 in step S108 so that the target person can see this projection image. In display data table D2, display data to be displayed in the projection image and a selection condition based on the movement speed and direction of movement of the person are managed in association with each other.

For example, when detected person 61 moves toward the projector device at a movement speed lower than the reference speed as in person 61 illustrated in FIG. 9A, controller 210 selects text data D21 from display data in display data table D2. Text data D21 includes a text having a detailed sales point of the shop of which information is to be provided. For example, text data D21 includes information concerning a sale on the shop of which information is to be provided.

In this case, target person 61 is moving toward the shop, so that he/she is likely to be interested in the shop. Therefore, projector device 100 projects a projection image having a content that attracts attention to the shop of which information is to be provided, thereby creating more interest of person 61 to the shop. In addition, since person 61 is walking at low speed, he/she is expected to be able to read even a detailed guidance content.

When detected person 62 is moving away from projector device 100 at a movement speed lower than the reference speed as in person 62 illustrated in FIG. 9A, controller 210 selects text data D22 from display data in display data table D2. Text data D22 includes a text indicating a detailed attention-attracting guidance content for attracting attention of a person moving away from the shop. For example, text data D22 includes information concerning a selling point of the shop of which information is to be provided.

In this case, since target person 62 is moving away from the shop, information attracting attention to the shop is provided. Since person 62 is walking, he/she is expected to be able to read even a detailed guidance content.

In addition, when detected person 61' is moving toward projector device 100 at a movement speed equal to or higher than the reference speed as in person 61' illustrated in FIG. 9B, controller 210 selects image data D23 from display data in display data table D2. Image data D23 includes a presentation image for boosting mood of the entry into the shop of which information is provided. For example, image data D23 includes image data such as a red carpet leading to the shop of which information is provided.

In this case, target person 61' is rushing toward the shop, so that he/she is likely to be eager to visit the shop.

Therefore, the projector device brings person 61' in the shop of which information is provided by projecting a presentation image for boosting mood of the entry to the shop. In addition, since the movement speed of person 61' is high, the projector device performs presentation such that person 61' can experience the realistic sensations of the entry to the shop, in place of the detailed guidance content.

In addition, when detected person 62' is moving away from the projector device at a movement speed equal to or higher than the reference speed as in person 62' illustrated in FIG. 9B, controller 210 selects image data D24 from display data in display data table D2. Image data D24 includes a text or an image having a guidance content for stopping a person who is moving away from the shop. For example, image data D24 includes image data of a return arrow graphic indicating a U-turn or image data of an X mark graphic.

In this case, since target person 62' is moving away from the shop, information attracting attention to the shop is provided. In consideration of the high movement speed of person 62', the projector device displays a guidance content which is easy to leave impression at a glance, in place of a detailed guidance content.

It is to be noted that, when the target person is moving away from the projector device, display data indicating appreciation for the visit to the shop may be selected in place of text data D22 or image data D24. At that time, the content to be projected may be changed between the case where the movement speed of the target person is low and the case where the movement speed of the target person is high. For example, the content for providing presentation effect or the like in a projection image may be changed.

Projector device 100 according to the present exemplary embodiment switches a projection image according to a movement speed of a target person, whereby a projection image with a vivid and realistic content or with a content well worth reading is projected at a timing at which the target person easily sees the projection image. Accordingly, guidance including information for leading a person, an advertisement, and the like by means of a projection image can effectively be provided.

Third Exemplary Embodiment

A third exemplary embodiment will be described below with reference to the drawings. In the first and second exemplary embodiments, a projection image for providing information of a shop to a target person is projected. On the other hand, in the present exemplary embodiment, a projector device projects a projection image for providing information of a place of a seat to a target person who is looking for his/her seat in a movie theater or the like. Specifically, a state of a target object in the present exemplary embodiment is information concerning an action of a person, which is the target object, for looking for his/her seat, and more specifically, a state of a target object is the distance between a person and his/her seat and whether or not the person is on a right row.

A projector device and a seat guidance system provided with the same according to the present exemplary embodiment will be described below in such a way that the configurations and operations similar to those of projector devices 100 in the first and second exemplary embodiments are omitted as appropriate.

<1. Configuration>

1-1. Outline of Seat Guidance System

Figure 11A:
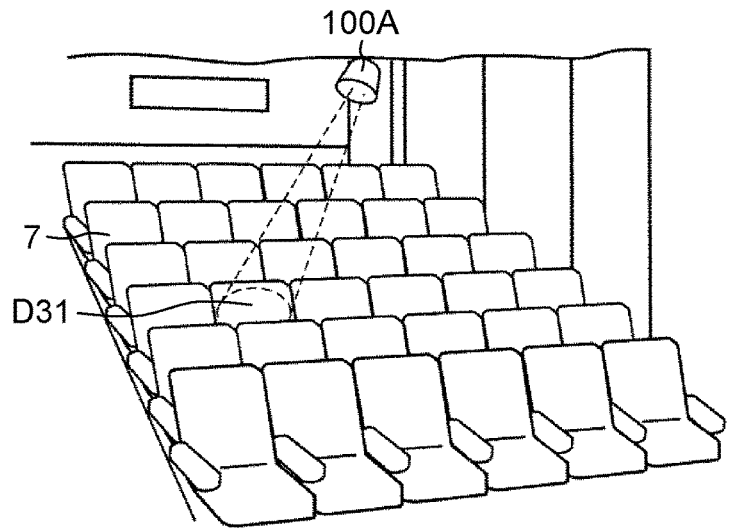
FIG. 11A is an explanatory view for describing an outline of a seat guidance system according to a third exemplary embodiment.
Figure 11B:
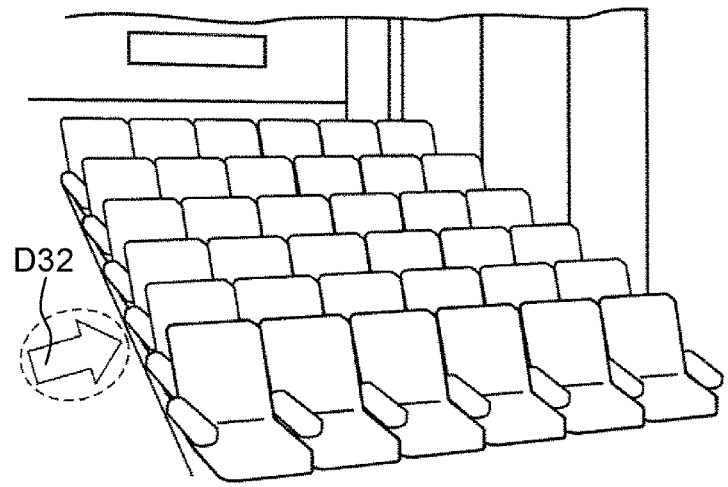
FIG. 11B is an explanatory view for describing the outline of the seat guidance system according to the third exemplary embodiment.
Figure 11C:
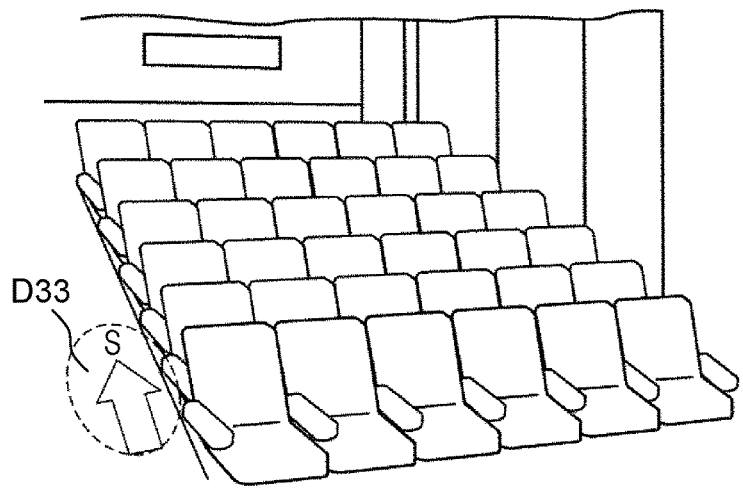
FIG. 11C is an explanatory view for describing the outline of the seat guidance system according to the third exemplary embodiment.

Firstly, the seat guidance system provided with the projector device according to the present exemplary embodiment will be described with reference to FIGS. 11A to 11C and 12. FIGS. 11A to 11C are explanatory views for describing the outline of the seat guidance system according to the present exemplary embodiment. FIG. 12 is a block diagram illustrating the configuration of the seat guidance system.

As illustrated in FIG. 12, the seat guidance system according to the present exemplary embodiment includes projector device 100A, ticket reader 700, and imaging unit 750. As illustrated in FIGS. 11A to 11C, projector device 100A is installed on a ceiling of a movie theater for illuminating a pathway or seat 7 of the movie theater. Ticket reader 700 and imaging unit 750 are installed at an entrance of the movie theater.

The seat guidance system performs a guidance process for leading person 64, who is going into the movie theater, to the seat indicated by the seat number on ticket C1 carried by person 64 using a projection image. Firstly, in the state in which target person 64 is looking for his/her seat, person 64 enters the area of the movie theater from the entrance of the movie theater, and causes ticket reader 700 near the entrance to read ticket C1. The seat guidance system reads ticket C1, and captures person 64 using imaging unit 750 to acquire information concerning person 64 and the seat number. Projector device 100A in the seat guidance system projects a projection image for leading person 64 to the place of the seat indicated by ticket C1 on the basis of the acquired information concerning person 64. In the present exemplary embodiment, projector device 100A changes the content to be projected according to the state of person 64 in order to lead person 64 to the seat rightly.

1-2. Configuration of Seat Guidance System

Next, the detailed configuration of the seat guidance system will be described with reference to FIG. 12.

Projector device 100A in the seat guidance system further includes communication unit 160 in addition to the configurations (not illustrated in FIG. 12) similar to those of projector device 100. Communication unit 160 includes a communication antenna to perform wireless communication with ticket reader 700. Note that the communication with ticket reader 700 may be performed in a wired manner.

In addition, memory 220 in projector device 100A stores in advance seat position information in which a position of each of a plurality of seats in the movie theater and a seat number of each seat are associated with each other. The seat position information is generated such that, upon the installment of projector device 100A, for example, controller 210 acquires distance information of a plurality of seats in the movie theater using distance detector 230, acquires seat number information of each seat from communication unit 160, and associates the acquired distance information and the acquired seat number information with each other. Note that, in the present exemplary embodiment, a seat number in the movie theater is indicated by the number of a seat along each row, such as "S-2".

Ticket reader 700 includes reading unit 710, controller 720, and communication unit 730.

Reading unit 710 includes a bar code reader, for example, and reads a bar code printed on ticket C1. The bar code on ticket C1 has recorded thereon seat number information indicating a seat number, and reading unit 710 acquires the seat number information from the bar code on ticket C1. Note that a QR code (registered trademark) may be used for recording and reading seat number information.

Communication unit 730 is an interface for transmitting/receiving various signals with communication unit 160 in projector device 100A, and includes a communication antenna. Communication unit 730 converts a signal output from controller 720 into a signal of a predetermined format, and wirelessly transmits the converted signal from the communication antenna.

Controller 720 controls the entire operation of ticket reader 700. Controller 720 is composed of a CPU or an MPU, for example, and implements the function thereof by executing a predetermined program. Note that the function of controller 720 may be implemented by an electronic circuit which is exclusively designed.

Imaging unit 750 is composed of a CCD camera or the like. Imaging unit 750 is installed for monitoring a person using ticket reader 700, and captures an image around ticket reader 700. Imaging unit 750 is connected to controller 720 in ticket reader 700, and outputs image data generated by capturing an image to controller 720. Note that the communication between imaging unit 750 and ticket reader 700 may not be performed in a wired manner, and may be performed in a wireless manner.

<2. Operation>

2-1. Operation of Seat Guidance System

In the seat guidance system, when reading unit 710 in ticket reader 700 reads the seat number information from ticket C1 of person 64, controller 720 acquires the image data from imaging unit 750. Controller 720 extracts a characteristic amount of the face or whole body of person 64 from the acquired image data to generate person information, and associates the seat number information read by reading unit 710 with the person information. Controller 720 transmits the person information associated with the seat number information to projector device 100A through communication unit 730.

When receiving the person information from ticket reader 700 through communication unit 160, projector device 100A performs a guidance projection process for leading the person identified by the received person information to the seat indicated by the seat number information associated with the person information. The guidance projection process according to the present exemplary embodiment will be described below.

2-2. Guidance Projection Process for Seat

Figure 13:
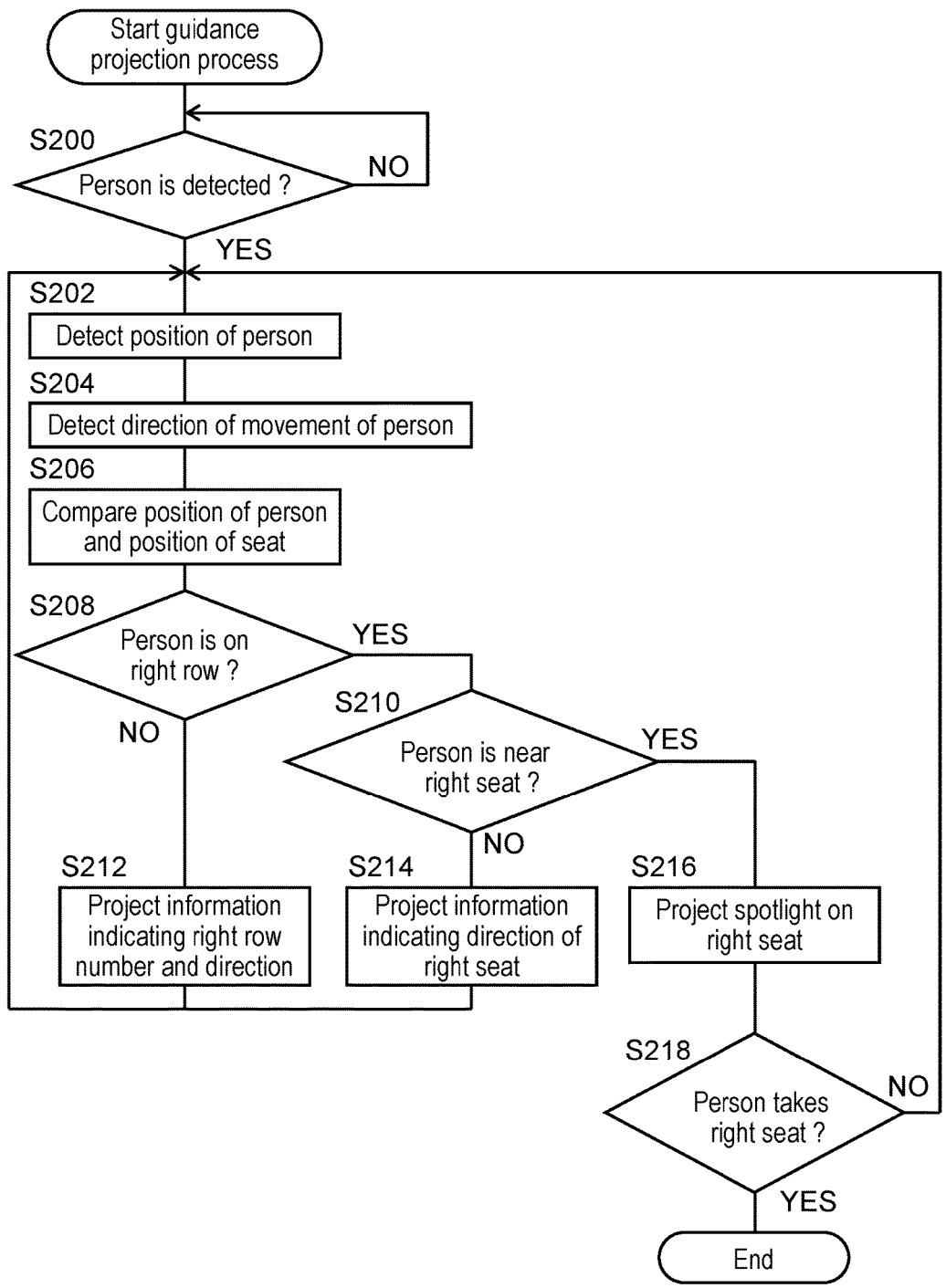
FIG. 13 is a flowchart illustrating a flow of a guidance projection process in the third exemplary embodiment.

The guidance projection process according to the present exemplary embodiment will be described with reference to FIGS. 12 to 14. FIG. 13 is a flowchart illustrating the flow of the guidance projection process in the present exemplary embodiment. FIG. 14 shows display data table D3 referred to in the guidance projection process in the present exemplary embodiment. This flow is executed by controller 210 in projector device 100A.

The guidance projection process illustrated in FIG. 13 is started after projector device 100A receives person information from ticket reader 700.

Controller 210 determines whether or not person 64 corresponding to the person information received from ticket reader 700 is detected (S200). In step S200, controller 210 captures an image around the installment position using imaging unit 240, and conducts face authentication or person authentication based on the characteristic amount of the whole body, on the basis of the person information received from ticket reader 700 in the captured image, thereby detecting person 64.

When detecting person 64 (YES in S200), controller 210 detects the position of detected person 64 using distance detector 230, for example (S202). Controller 210 also detects the direction of movement of person 64 (S204). The position and direction of movement of the person are detected similarly to the processes in steps S102 and S104 of the guidance projection process in the first exemplary embodiment.

Next, controller 210 reads the seat position information stored in memory 220 to specify the position of the seat indicated by the seat number information associated with the person information received from ticket reader 700, and compares the position of person 64 detected in step S202 and the specified position of the seat (S206).

Then, controller 210 determines whether or not person 64 is on the right row, that is, on the row same as the row in the seat number information, on the basis of the comparison result in step S206 (S208).

When controller 210 determines that person 64 is not on the right row (NO in S208), person 64 is likely to falsely recognize his/her seat. Therefore, controller 210 projects a projection image showing right position information of the seat to person 64 by the process in step S212. Specifically, controller 210 projects information showing the right row number and the direction for the row by referring to display data table D3 (S212).

Specifically, as illustrated in FIG. 14, display data table D3 manages display data of a projection image and a selection condition based on the distance between the position of a person and a seat and whether or not the person is on the right row in association with each other. In step S212, controller 210 firstly selects display data D33 from display data table D3. Display data D33 includes an arrow image indicating a direction and a text indicating a right row. The text indicating a right row is recognized by referring to the seat number information from ticket reader 700. Next, controller 210 controls driver 110 such that the projection direction of projector unit 250 is set on a position distant from person 64 by a predetermined distance on an extension of the direction of movement of person 64 and generates a projection image of display data D33 so that the arrow image in display data D33 is directed to the right row. Controller 210 projects the projection image of display data D33 as illustrated in FIG. 11C, for example, and returns to the process in step S202.

On the other hand, when determining that person 64 is on the right row (YES in S208), controller 210 determines whether or not person 64 is near the right seat (seat having the seat number indicated by the seat number information) on the basis of the comparison result in step S206 (S210). The determination process in step S210 is made on the basis of whether or not the distance between the position of person 64 detected in step S202 and the position of the seat specified in step S206 is less than a predetermined threshold, for example.

When controller 210 determines that person 64 is not near the right seat (NO in S210), person 64 is likely to be going to his/her seat rightly. Accordingly, controller 210 helps person 64 to reach the right seat or leads person 64 to the right seat by the process in step S214. That is, controller 210 selects display data D32 from display data table D3, and projects information indicating the direction of the right seat (S214). Controller 210 projects the projection image of display data D32 as illustrated in FIG. 11B, for example, and returns to the process in step S202.

On the other hand, when controller 210 determines that person 64 is near the right seat (YES in S210), person 64 is likely to be going to the right seat near the right seat. Accordingly, controller 210 assists the action or sets the mood for the action until person 64 finally sits down. That is, controller 210 selects display data D31 from display data table D3, and projects a spotlight on the right seat (S216).

Specifically, controller 210 controls driver 110 such that projector unit 250 is directed to the position of the seat of person 64 on the basis of the seat position information, and projects a spotlight of display data D31 on the seat of person 64 as illustrated in FIG. 11A, for example.

Next, controller 210 determines whether or not person 64 takes the right seat by acquiring an image captured by imaging unit 240 and performing image analysis (S218), for example. For example, controller 210 determines that person 64 sits down by detecting that person 64 does not move from the position of the right seat for a predetermined period in the captured image.

When determining that person 64 does not take the right seat (NO in S218), controller 210 returns to the process in step S202.

On the other hand, when determining that person 64 takes the right seat (YES in S218), controller 210 ends this guidance projection process.

As described above, in the guidance projection process in the present exemplary embodiment, projector device 100A detects person 64 who is looking for his/her seat in a movie theater in step S200, and detects the state of detected person 64 in steps S202 and S204. Projector device 100A changes the content to be provided using a projection image on the basis of the state of detected person 64.

Notably, when the direction of movement of person 64 is not the direction toward the right seat (NO in S208) and the position of person 64 is distant from the right seat, person 64 is likely to leave his/her seat and go to a restroom. In view of this, controller 210 may determine whether or not the state of person 64 corresponds to the above-mentioned case. When it corresponds to the above-mentioned case, controller 210 may project position information of the seat similarly to step S214, and determine whether or not person 64 changes the direction of movement according to the projection image in a predetermined period. When determining that person 64 does not change the direction of movement within the predetermined period, controller 210 may consider the possibility in which person 64 is going to another location, and further project guidance information of a restroom or a shop.

Fourth Exemplary Embodiment

A fourth exemplary embodiment will be described below with reference to the drawings. In the third exemplary embodiment, a projection image showing a seat to a target person is projected. In the present exemplary embodiment, in the state in which a target vehicle (the driver of the vehicle) is looking for an empty space in a parking area as a state of a target object, a projection image showing an empty space in the parking area is projected to the target vehicle. Specifically, a state of a target object in the present exemplary embodiment is information concerning an action of a vehicle (driver), which is the target object, for looking for an empty space, and more specifically, a state of a target object is the distance between the vehicle and an empty space and how many empty spaces there are around the vehicle.

A projector device according to the present exemplary embodiment will be described below in such a way that the configurations and operations similar to those of the projector devices in the first to third exemplary embodiments are omitted as appropriate.

FIGS. 15A to 15D are explanatory views for describing a guidance projection process of the projector device according to the present exemplary embodiment. In the present exemplary embodiment, projector device 100 is installed on a ceiling of a multilevel parking structure or the like in such a manner that it can illuminate a pathway or a parking spot of the multilevel parking structure as illustrated in FIGS. 15A to 15D, for example. Memory 220 in projector device 100 stores the presence of an empty spot having no vehicle parked thereon and empty spot information indicating the position of an empty spot out of parking spots around the place where projector device 100 is installed. The empty spot information is periodically updated (for example, once per minute). For example, controller 210 in projector device 100 may periodically capture parking spots around the installment place using imaging unit 240 to acquire empty spot information through image recognition of a vehicle, or may acquire empty spot information through communication with an external server that manages empty spots.

Figure 16:
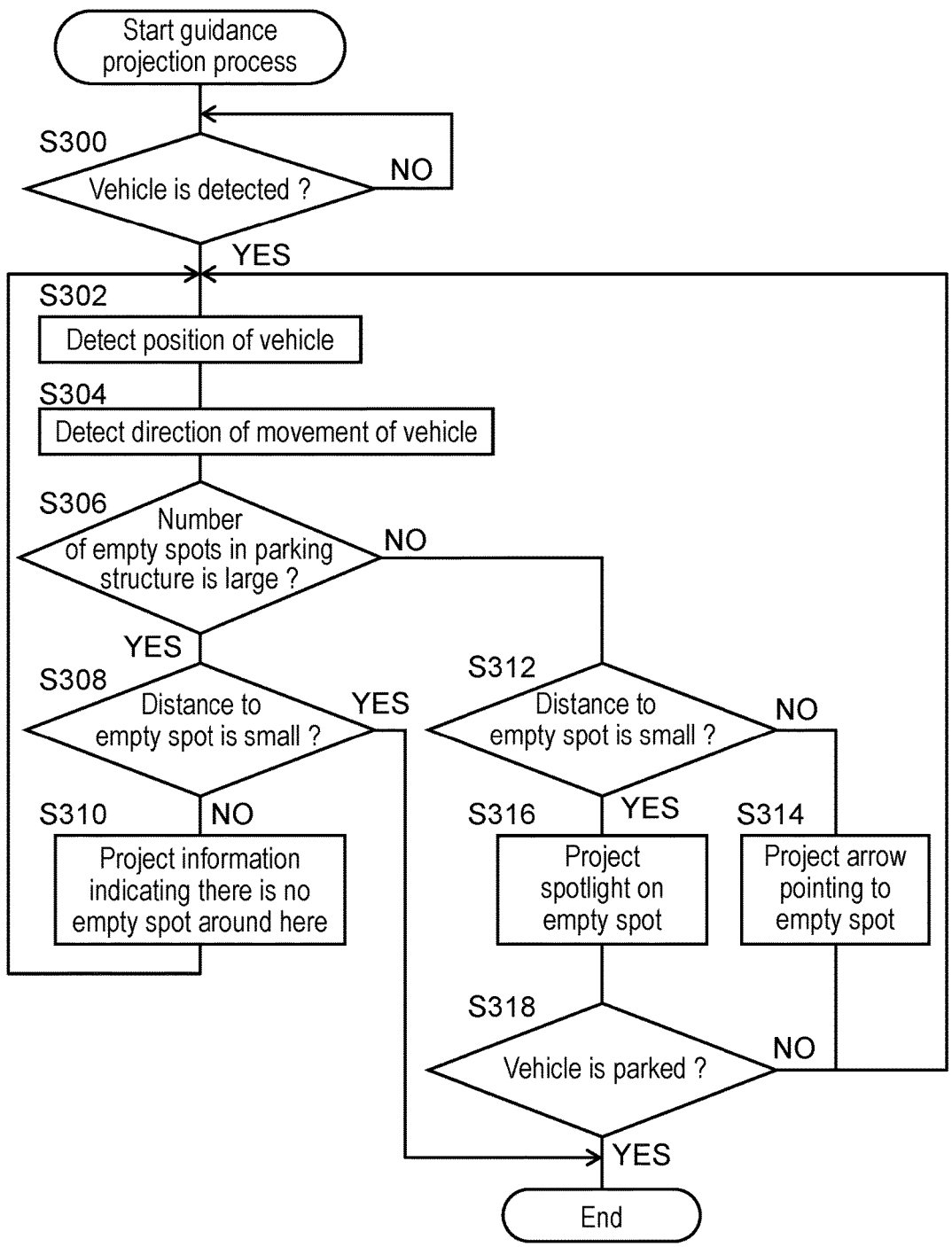
FIG. 16 is a flowchart illustrating a flow of the guidance projection process in the fourth exemplary embodiment.

Subsequently, the guidance projection process according to the present exemplary embodiment will be described with reference to FIGS. 15 to 17. FIG. 16 is a flowchart illustrating the flow of the guidance projection process in the present exemplary embodiment. FIG. 17 shows display data table D4 referred to in the guidance projection process in the present exemplary embodiment. In display data table D4, display data to be displayed in a projection image and a selection condition based on how many empty spots there are and the distance between a target vehicle and an empty spot are managed in association with each other.

Firstly, when target vehicle 65 is looking for an empty spot, vehicle 65 gets a parking ticket at the entrance of the parking structure, and enters an area of the parking structure. Then, controller 210 determines whether or not specific vehicle 65 is detected (S300). In step S300, controller 210 detects the presence of vehicle 65 moving along the pathway of the parking structure from acquisition information of a parking ticket, or by capturing an image around the installment position using imaging unit 240 and performing image analysis of the captured image. In this case, controller 210 may recognize a registration number on a number plate of detected vehicle 65. Thus, controller 210 can reliably detect vehicle 65 to be tracked.

When detecting vehicle 65 (YES in S300), controller 210 detects the position of detected vehicle 65 using distance detector 230, for example (S302). Controller 210 also detects the direction of movement of vehicle 65 (S304). The position and direction of movement of vehicle 65 are detected similarly to the detection of the position and direction of movement of a person in the guidance projection processes in the first to third exemplary embodiments.

Next, controller 210 reads empty spot information from memory 220, and determines whether or not the number of empty spots in the parking structure is larger than a predetermined number based on the empty spot information (S306).

When determining that the number of empty spots in the parking structure is large (YES in S306), controller 210 determines whether or not the distance from the position of vehicle 65 detected in step S302 to the position of the closest empty spot is smaller than a predetermined distance (S308). The distance from the position of vehicle 65 to the position of the empty spot may be measured in a straight line or may be calculated from the length of the route along the passage on which the vehicle can pass.

When determining that the distance from the position of vehicle 65 to the empty spot is small (YES in S308), controller 210 ends this process.

In such a case, a driver or the like of vehicle 65 can easily recognize the presence of an empty spot by visual confirmation, so that controller 210 does not bother to project a projection image, as illustrated in FIG. 15A.

On the other hand, when determining that the distance from the position of vehicle 65 to the empty spot is not small (NO in S308), controller 210 selects display data D42 from display data table D4, and projects information indicating that there is no empty spot around here (S310). Display data D42 includes a text of "Full in this area", for example. The projection image is projected on the position forward from the body of vehicle 65 by a predetermined distance, for example.

In such a case, there are many empty spots in the parking structure, but empty spots are not near vehicle 65 but distant therefrom. Therefore, controller 210 provides information indicating that there is no empty spot around here as illustrated in FIG. 15C. Note that, in addition to or in place of the projection image of display data D42, a projection image such as an arrow image for leading vehicle 65 to the place where there are many empty spots may be projected. In this case, a projection image indicating that empty spots exist in another place (for example, on another level) may be displayed.

Controller 210 projects the projection image of display data D42, and then, returns to the process in step S302.

When determining that the number of empty spots in the parking structure is small (NO in S306), controller 210 determines whether or not the distance from the position of vehicle 65 detected in step S302 to the position of the closest empty spot is smaller than a predetermined distance (S312).

When determining that the distance from the position of vehicle 65 to the empty spot is not small (NO in S312), controller 210 selects display data D43 from display data table D4, and projects a projection image indicating the position where empty spots exist, that is, a projection image showing the direction (S314). Display data D43 is an arrow image, for example. Controller 210 generates a projection image in such a way that display data D43 is directed to the position of the empty spot on the basis of the empty spot information.

In such a case, empty spots are distant from the position of vehicle 65 and there are a few empty spots left in the parking structure. Therefore, controller 210 leads vehicle 65 to these empty spots as illustrated in FIG. 15D. In this case, a projection image indicating that only a few empty spots are left may be displayed.

Controller 210 projects the projection image of display data D43, and then, returns to the process in step S302.

On the other hand, when determining that the distance from the position of vehicle 65 to the empty spot is small (YES in S312), controller 210 selects display data D41 from display data table D4, and projects a spotlight onto the empty spot (S316).

In such a case, when there are a lot of vehicles parked in each parking spot, it is difficult to find out where the empty spot is, as illustrated in FIG. 15B. In view of this, controller 210 projects a spotlight to help the driver or the like of vehicle 65 to find out the empty spot.

Next, controller 210 determines whether or not vehicle 65 is parked on an empty spot by acquiring an image captured by imaging unit 240 and performing image analysis (S318), for example. For example, controller 210 determines that vehicle 65 is parked by detecting that vehicle 65 does not move from the empty spot for a predetermined period in the captured image.

When determining that vehicle 65 is not parked in the empty spot (NO in S318), controller 210 returns to the process in step S302.

On the other hand, when determining that vehicle 65 is parked in the empty spot (YES in S318), controller 210 ends this guidance projection process.

As described above, in the guidance projection process in the present exemplary embodiment, projector device 100 detects vehicle 65 that is looking for an empty spot in a parking area in step S300, and detects the state of detected vehicle 65 in steps S302 and S304. Projector device 100 changes the content to be provided using a projection image on the basis of the state of detected vehicle 65.

Note that, while the body of vehicle 65 is detected in step S300, a person such as a driver on vehicle 65 may be detected in place of the body of vehicle 65, for example. In this case, an eye level of a person may be recognized, and a projection position of a projection image may be adjusted according to the recognized eye level, for example.

Other Exemplary Embodiments

As described above, the first to fourth exemplary embodiments have been described above as an illustration of the technique disclosed in the present application. However, the technique in the present disclosure is not limited to this, and can be applied to embodiments in which various changes, replacements, additions, omissions, etc., are made. Furthermore, an embodiment can be formed by combining each component described in the first to fourth exemplary embodiments described above.

The other exemplary embodiments will be described below.

In the first to fourth exemplary embodiments, a target object tracked by a projection image is a person and a vehicle as one example. However, the target object is not limited thereto. The target object may be a moving body which can be a target to be guided, and examples of the moving body include a living object such as a person and a pet, and a transportation tool such as a vehicle, a railway, a vessel, and an aircraft. In addition, a vehicle is not limited to an automobile, and may be a motorbike or a motorcycle.

A state of a target object in the first exemplary embodiment is the distance between the target object and the projector device and a direction of movement of the target object, and a state of a target object in the second exemplary embodiment is a movement speed of the target object and a direction of movement of the target object. In addition, a state of a target object in the third exemplary embodiment is the distance from the target object to a seat and whether or not the target object is on the right row, and a state of a target object in the fourth exemplary embodiment is the distance from the target object to an empty spot and how many empty spots there are around the target object. However, a state of a target object is not limited to the states of a target object in the first to fourth exemplary embodiments.

For example, in all of the first to fourth exemplary embodiments, a state of a target object is information concerning the action of movement of the target object. Specifically, a state of a target object is information concerning a passing movement of the target object in the first and second exemplary embodiments, information concerning the action of the target object for looking for a seat in the third exemplary embodiment, and information concerning the action of the target object for looking for an empty spot in the fourth exemplary embodiment. However, a state of a target object is not necessarily information concerning an action of movement of the target object. For example, a state of a target object may be an action of changing a pose or posture of the target object, such as a person's action of standing up or down, or a person's action of moving his/her head or four limbs, that is, information concerning an action not accompanied by a movement of a target object.

In addition, in the first to fourth exemplary embodiments, a state of a target object is information concerning an action of the target object. However, it is not limited thereto. A state of a target object may be information not concerning an action of the target object, that is, a change in color of the target object, a change in temperature of the target object, a change in a pattern of the target object, and the like.

In the first to fourth exemplary embodiments, a text such as an advertisement, a symbol such as an arrow, an image such as a red carpet, and the like are projected as a projection image. However, the projection image is not limited thereto. Any projection image may be used, so long as it includes guidance information having a content for guiding a target object. Examples of the guidance information include information for leading a target object to a specific place or direction, information concerning warning for causing a target object to stop or decrease the movement speed, and information that affects a movement of a target object. However, the guidance information is not limited thereto, and may be information that is only provided to a target object without affecting a movement of the target object.

The projector devices in the first to fourth exemplary embodiments include imaging unit 240 as one example of a first detector that detects a specific target object, and distance detector 230 as one example of a second detector that detects a state of a target object detected by the first detector. However, the configuration is not limited thereto. For example, the projector device may include distance detector 230 as one example of the first detector, and imaging unit 240 as one example of the second detector. Alternatively, first and second detectors are implemented by one unit, that is, by either one of distance detector 230 and imaging unit 240. Specifically, both the detection of a specific target object and the detection of the state of this target object may be performed by only one of distance detector 230 and imaging unit 240.

In addition, distance detector 230 and imaging unit 240 are fixed to be directed in the direction same as the projection direction of projector unit 250. However, the configuration is not limited thereto. For example, distance detector 230 and imaging unit 240 may be installed on a position different from the installment position of projector device 100.

In the first to fourth exemplary embodiments, a projection direction in which a projection image is projected is changed by driving projector unit 250 by driver 110, by which the projection position of the projection image is changed so that the projection image tracks the target object. However, the configuration is not limited thereto. For example, the projection position of the projection image may be changed so that the projection image tracks the target object under the control for projector unit 250 by controller 210. Specifically, an angle of view for projection may be set wider than that of a projection image that is to be actually projected, and the projection image may be moved within the angle of view for projection, by which the projection image tracks a target object while changing the relative position between the projection image and the target object. In addition, as another specific example, a projection size of a projection image may be changed by digital zoom control, by which the projection image locally tracks the target object while changing the relative position between the target object and a point of an arrow in an arrow image, for example. In these specific examples, driver 110 is not always needed. The projection position of the projection image can be changed so that the projection image tracks the target object only by the control for projector unit 250 by controller 210 without the control by driver 110. In addition, controller 210 may control both projector unit 250 and driver 110, thereby changing the projection position of the projection image so that the target object tracks the projection image.

In the first to fourth exemplary embodiments, a projection image is projected on a position forward from a person or a body of a vehicle by a predetermined distance in a direction of movement. However, the position where the projection image is to be projected is not limited thereto. For example, the projection position may be changed according to the movement speed of the target object, that is, the higher the movement speed of the target object is, the farther the projection position from the target object is. In addition, the projection position of the projection image may be changed so that the projection image takes a lead of the movement of the target object.

The seat guidance system according to the third exemplary embodiment shows a seat in a movie theater using a projection image. However, for example, it may show a seat in a concert hall or multipurpose hall, a seat in a ball game field or an arena, a reserved seat in a restaurant, a seat in an airplane or a ship, and the like, besides a seat in a movie theater.

In the third and fourth exemplary embodiments, a destination shown to a target object is a seat or an empty spot. However, the destination shown to a target object is not limited thereto. For example, the destination may be a place in a specific event site, or a specific display booth in a museum or an exhibition hall. In addition, the destination to be shown to a target person may be the parking spot where the vehicle of the target person is parked.

The projector device according to the present disclosure is applicable to various usages for projecting a projection image onto a projection surface.

What is claimed is:

1. A projector device comprising:
    a first detector that detects a specific target object;
    a projector unit that projects a projection image;
    a driver that drives the projector unit such that a projection direction in which the projection image is to be projected is changed;
    a second detector that detects a movement vector of the target object detected by the first detector;
    a controller that controls at least one of the projector unit and the driver such that the projection image tracks the target object; and
    a memory that stores a table including a predetermined speed information of the movement vector of the target object and contents data corresponding to a speed information, the contents data including text data and image data,
    wherein
    the projection image includes guidance information having a content for guiding the target object, and
    the controller changes a content of information included in the guidance information in the projection image, which is to be projected while tracking the target object, according to the movement vector of the target object detected by the second detector, and
    wherein
    the controller sets the text data in the projection image when a speed of the movement vector of the target object is lower than a predetermined speed, and the controller sets the image data in the projection image when the speed of the movement vector of the target object is equal to or higher than the predetermined speed.

2. The projector device according to claim 1, wherein
the controller sets the guidance information in the projection image, which is to be projected while tracking the target object, to a content including text data indicating a detailed guidance content, when a speed of the movement vector of the target object is lower than a predetermined speed, and
the controller sets the guidance information in the projection image, which is to be projected while tracking the target object, to image data, when the speed of the movement vector of the target object is equal to or higher than the predetermined speed.

3. The projector device according to claim 1, wherein
when the movement vector of the target object has an orientation approaching the second detector, the controller causes the projector unit to project the projection image having guidance information for leading the target object.

4. The projector device according to claim 1, wherein
when the movement vector of the target object has an orientation away from the second detector, the controller causes the projector unit to project the projection image having guidance information with a content for attracting attention of the target object.

5. The projector device according to claim 1, wherein
at least one of the first detector and the second detector includes a distance detector that detects a distance between the distance detector and the target object.

6. The projector device according to claim 1, wherein
at least one of the first detector and the second detector includes an camera that captures an image of the target object.

* * * * *